(12) United States Patent
Sakatani et al.

(10) Patent No.: US 7,045,005 B2
(45) Date of Patent: May 16, 2006

(54) CERAMICS DISPERSION LIQUID, METHOD FOR PRODUCING THE SAME, AND HYDROPHILIC COATING AGENT USING THE SAME

(75) Inventors: Yoshiaki Sakatani, Niihama (JP); Hironobu Koike, Niihama (JP); Hiroyuki Ando, Niihama (JP)

(73) Assignee: Sumitomo Chemical Company, Limited, Osaka (JP)

(*) Notice: Subject to any disclaimer, the term of this patent is extended or adjusted under 35 U.S.C. 154(b) by 790 days.

(21) Appl. No.: 10/194,052

(22) Filed: Jul. 15, 2002

(65) Prior Publication Data

US 2003/0027704 A1 Feb. 6, 2003

(30) Foreign Application Priority Data

| Jul. 19, 2001 | (JP) | ................................ | 2001-219492 |
| Jul. 19, 2001 | (JP) | ................................ | 2001-219493 |
| Nov. 15, 2001 | (JP) | ................................ | 2001-349770 |
| Dec. 25, 2001 | (JP) | ................................ | 2001-391186 |

(51) Int. Cl.
*B01J 31/04* (2006.01)

(52) U.S. Cl. .................... 106/287.17; 106/287.18; 106/287.19; 502/170; 502/522

(58) Field of Classification Search ............ 106/287.17, 106/287.18, 287.19; 502/170, 522
See application file for complete search history.

(56) References Cited

U.S. PATENT DOCUMENTS

| 2,480,092 | A |   | 8/1949 | Whately |
| 4,165,239 | A |   | 8/1979 | Linden et al. |
| 5,011,674 | A |   | 4/1991 | Yoshimoto et al. |
| 6,013,372 | A |   | 1/2000 | Hayakawa et al. |
| 6,407,033 | B1 | * | 6/2002 | Kimura et al. ............ 502/350 |
| 6,627,579 | B1 | * | 9/2003 | Sakatani et al. ........... 502/350 |
| 6,824,603 | B1 | * | 11/2004 | Kydd .................... 106/287.35 |
| 2002/0005145 | A1 |   | 1/2002 | Sherman |
| 2002/0012628 | A1 |   | 1/2002 | Sawabe et al. |
| 2002/0021999 | A1 |   | 2/2002 | Sakatani et al. |
| 2002/0051746 | A1 |   | 5/2002 | Okusako |
| 2003/0161784 | A1 |   | 8/2003 | Okusako et al. |

FOREIGN PATENT DOCUMENTS

| DE | 44 10 662 C1 | 9/1995 |
| EP | 0 666 107 A2 | 8/1995 |
| EP | 0 675 086 A2 | 10/1995 |
| EP | 0 846 494 A1 | 6/1998 |
| EP | 1 031 538 A1 | 8/2000 |
| EP | 1 065 169 A1 | 1/2001 |
| EP | 1 095 908 A1 | 5/2001 |
| EP | 1 127 844 A1 | 8/2001 |
| EP | 1 138 634 A1 | 10/2001 |
| EP | 1 160 202 A1 | 12/2001 |
| EP | 1 174 392 A1 | 1/2002 |
| EP | 1 178 011 A1 | 2/2002 |
| EP | 1 188 718 A2 | 3/2002 |
| EP | 1 199 103 A2 | 4/2002 |
| EP | 1 205 244 A1 | 5/2002 |
| EP | 1 219 569 A2 | 7/2002 |
| EP | 1 279 643 A2 | 1/2003 |
| EP | 1 285 953 A1 | 2/2003 |
| EP | 1 338 564 A2 | 8/2003 |
| FR | 2 677 012 A1 | 12/1992 |
| JP | 62-207718 A | 9/1987 |
| JP | 10-67516 A | 3/1998 |
| JP | 2000-140636 | 5/2000 |
| JP | 2001-98220 A | 4/2001 |
| JP | 2001-096168 A | 4/2001 |
| JP | 2001-278627 A | 10/2001 |
| JP | 2003-48715 A | 2/2003 |
| JP | 2003-171578 A | 6/2003 |
| JP | 2003-221230 A | 8/2003 |
| WO | WO 96/29375 A1 | 8/1996 |
| WO | WO 00/10921 A1 | 3/2000 |
| WO | WO 00/18686 A1 | 4/2000 |
| WO | WO 01/56928 A1 | 8/2001 |
| WO | WO 02/40609 A1 | 5/2002 |

OTHER PUBLICATIONS

13. Shinri Sato, "Photocatalytic Activity of NOx–Doped TiO2 in the Visible Light Region", Chemical Physics Letters, vol. 123, No. 1,2 (Jan. 3, 1986), pp. 126–128.
U.S. Appl. No. 10/438,813, filed (May 16, 2003) to Sakatani et al.
U.S. Appl. No. 10/456,746, filed (Jun. 9, 2003) to Sakatani et al.
U.S. Appl. No. 10/664,979, filed (Sep. 22, 2003) to Sakatani et al.
M. Miyauchi et al., "Reversible wettability control of $TiO_2$ surface by light irradiation," Surface Science, 511, (2002), no month provided, pp. 401–407.
R. Asahi et al., "Visible–Light Photocatalysis in Nitrogen–Doped Titanium Oxides", Science, vol. 293, (Jul. 13, 2001) pp. 269–271.
U.S. Appl. No. 10/732,367, filed Dec. 11, 2003, Okusako.
E. Kanezaki et al., "Solid–state Chemistry of Thermally Induced Yellow Coulouring in Synthetic Hydrous Titanium Oxide from TiC13", J. Chem. Soc. Faraday Trans., vol. 88, No. 24, (1992), no month provided, pp. 3583–3586.

(Continued)

*Primary Examiner*—David Brunsman
(74) *Attorney, Agent, or Firm*—Sughrue Mion, PLLC

(57) ABSTRACT

A ceramics dispersion liquid is provided. The dispersion liquid may form an applied film easily recovering hydrophilic properties with light irradiation even when contaminated by lipophilic materials. The ceramics dispersion liquid comprises a ceramics, a dispersion medium, and at least one compound selected from a carboxylic acid, an ammonium carboxylate, a salt of carboxylic acid with metal selected from Ia group, IIa group, IIIa group, Va group, VIa group, VIIa group, VIII group, Ib group, IIb group, IIIb group, IVb group and lanthanoid group, and a salt of oxalic acid with metal selected from IVa group.

28 Claims, 9 Drawing Sheets

OTHER PUBLICATIONS

Abstract of Fang et al., "Preparation of fine spherical titania particles by thermolysis of the peroxo complex", STN Chemical Abstracts, vol. 120, No. 8, (Feb. 21, 1994) (XP–002139805).

Patent Abstracts of Japan, vol. 1997, No. 07, (Jul. 31, 1997) corresponding to JP 09–071418.

Database WPI, Section Ch Week 199802, Derwent Publications, Ltd., XP002268023 corresponding to JP 09–278443 (1998), no month provided.

Lei et al., "Studies on Process Conditions of Preparing Nano–Titanium Dioxide with Homogenous Precipitation Method", *Inorganic Chemicals Industry,* vol. 33, No. 2, Mar. 2001, pp. 3–5, with English translation.

* cited by examiner

● Example 5
△ Comparative Example 2

CERAMICS DISPERSION LIQUID, METHOD FOR PRODUCING THE SAME, AND HYDROPHILIC COATING AGENT USING THE SAME

BACKGROUND OF THE INVENTION

1. Field of the Invention

The present invention relates to a ceramics dispersion liquid, a hydrophilic coating agent using the same, and a photocatalytic functional product. The ceramics dispersion liquid may be used for various materials to have hydrophilic properties.

2. Related Art of the Invention

Various ceramics dispersion liquids have been reported. In recent years, it is noticed that a ceramics dispersion liquid may make a surface of various materials hydrophilic by a photocatalytic process. Here, "to make a surface hydrophilic by a photocatalytic process" means to activate, by light irradiation, a catalyst in a film which is made from a dispersion liquid and is applied on a material surface, thereby hydrophilizing the applied film itself; to decompose low hydrophilic materials (i.e., lipophilic materials and the like) on an applied-film surface, thereby recovering hydrophilic properties of the applied film; or both of them. For example, Laid-Open Publication W096/29375 discloses that a titanium oxide photocatalyst coating agent which is obtained by mixing titania sol with silica sol may provide such an applied film. The titanium oxide photocatalyst coating agent for forming a hydrophilic film is also sold at a market. With light irradiation using a special light source such as germicidal lamp, applied films made from such known titanium oxide photocatalyst coating agents may have a certain degree of hydrophilic properties to provide an anti-clouding effect and a self-cleaning effect at some degrees. However, the applied films have problems such that, once contamination of lipophilic materials spreads to all over the applied film, long period of time would be needed to recover the hydrophilic properties. Accordingly, further improvement has been demanded.

SUMMARY OF THE INVENTION

The present investors have conducted research on ceramics in order to develop a ceramics dispersion liquid that may form an applied film easily recovering hydrophilic properties with light irradiation even when contaminated by lipophilic materials. As a result, the present investors have found that a ceramics dispersion liquid comprising an organic acid may provide an applied film that recovers hydrophilic properties with light irradiation even when whole surface of the applied film was contaminated with lipophilic materials and that shows the hydrophilic properties continuously. Also, the present investors have found that a ceramics dispersion liquid comprising an organic acid may provide an applied film that highly shows the hydrophilic properties with light irradiation by a lighting equipment commonly utilized in a house without using a specific light source like a germicidal lamp. The present invention has been accomplished based on the above findings.

The present invention provides a ceramics dispersion liquid comprising
(i) a ceramics,
(ii) a dispersion medium, and
(iii) at least one compound selected from a carboxylic acid; an ammonium carboxylate; a salt of carboxylic acid with metal selected from Ia group, IIa group, IIIa group, Va group, VIa group, VIIa group, VIII group, Ib group, IIb group, IIIb group, IVb group and lanthanoid group; and a salt of oxalic acid with metal selected from IVa group.

The present invention also provides a method for producing a ceramics dispersion liquid comprising the steps of mixing a ceramics, a dispersion medium, and at least one compound selected from the above-described salts (iii), hydrates thereof and acid anhydrides thereof to obtain a mixture thereof, and subjecting the mixture to a dispersion treatment.

Furthermore, the present invention provides a hydrophilic coating agent comprising the above-described ceramics dispersion liquid.

An applied film obtained by applying such a ceramics dispersion liquid or such a hydrophilic coating agent on a base material may easily recover hydrophilic properties, even when contaminated with lipophilic materials.

The present invention further provides the applied film, and, moreover, provides a photocatalytic functional product having the applied film.

For example, the present invention provides a photocatalytic functional product having an applied film which has properties such that, when an acetone solution containing oleic acid is applied and is dried on a surface of the applied film and then the film is irradiated with visible light in air at a temperature of about 25° C. for 24 hours using a 500 W xenon lamp in which light with a wavelength of no more than 430 nm is cut, the film has a water contact angle of no more than 45°.

DETAILED DESCRIPTION OF THE INVENTION

Figure 1:
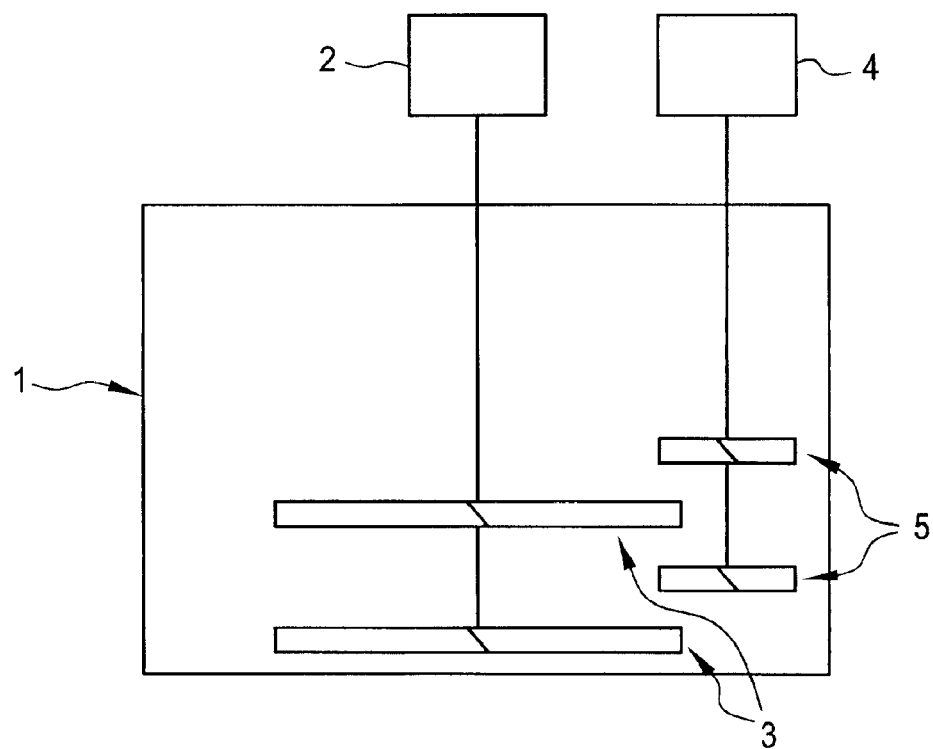
FIG. 1 shows a schematic diagram of a reactor which may be used for obtaining a titanium oxide as a ceramics utilized in the present invention by a reaction of a titanium compound and a base such as ammonia.

A ceramics dispersion liquid in the present invention comprises;
(i) a ceramics,
(ii) a dispersion medium, and
(iii) at least one compound selected from a carboxylic acid; an ammonium carboxylate; a salt of carboxylic acid with metal selected from Ia group, IIa group, IIIa group, Va group, VIa group, VIIa group, VIII group, Ib group, IIb group, IIIb group, IVb group and lanthanoid group; and a salt of oxalic acid with metal selected from IVa group.

A ceramics dispersion liquid in present invention contains at least one compound (iii) selected from a carboxylic acid; an ammonium carboxylate; the above described salt of carboxylic acid and the above described salt of oxalic acid.

Examples of the carboxylic acid include monocarboxylic acid such as formic acid, acetic acid and propionic acid; dicarboxylic acid such as oxalic acid, glutaric acid, succinic acid, malonic acid, maleic acid and adipic acid; and tricarboxylic acid such as citric acid.

Examples of the ammonium carboxylate include ammonium carboxylate such as ammonium acetate, ammonium oxalate, ammonium hydrogen oxalate, ammonium citrate and ammonium hydrogen citrate.

Examples of the salt of carboxylic acid with metal selected from Ia group, IIa group, IIIa group, Va group, VIa group, VIIa group, VIII group, Ib group, IIb group, IIIb group, IVb group, and lanthanoid group include Ia-group metal (alkali metal) salt of carboxylic acid such as lithium oxalate, lithium hydrogen oxalate, sodium oxalate, sodium hydrogen oxalate, potassium oxalate, and potassium hydrogen oxalate; IIa-group metal (alkaline earth metal) salt of carboxylic acid such as magnesium oxalate, calcium oxalate, strontium oxalate and barium oxalate; IIIa-group metal salt of carboxylic acid such as yttrium oxalate; Va-group metal salt of carboxylic acid such as vanadium oxalate, niobium oxalate and tantalum oxalate; VIa-group metal salt of carboxylic acid such as chromium oxalate, molybdenum oxalate, and tungsten oxalate; VIIa-group metal salt of carboxylic acid such as manganese oxalate; VIII-group metal salt of carboxylic acid such as iron oxalate, iron ammonium oxalate, cobalt oxalate, nickel oxalate, ruthenium oxalate, rhodium oxalate, palladium oxalate, osmium oxalate, iridium oxalate and platinum oxalate; Ib-group metal salt of carboxylic acid such as copper oxalate, silver oxalate and gold oxalate; IIb-group metal salt of carboxylic acid such as zinc oxalate; IIIb-group metal salt of carboxylic acid such as aluminum oxalate, gallium oxalate and iridium oxalate; IVb-group metal salt of carboxylic acid such as germanium oxalate, tin oxalate and lead oxalate; lanthanoid salt of carboxylic acid such as lanthanum oxalate, cerium oxalate and samarium oxalate.

Examples of the salt of oxalic acid with metal selected from IVa group include a salt of oxalic acid with titanium, a salt of oxalic acid with zirconium and a salt of oxalic acid with hafnium.

The above-described salt of oxalic acid with titanium may include titanium oxalate $[Ti_2(C_2O_4)_3]$, titanium oxy oxalate $[(TiO)_2OC_2O_4]$, a double salt of titanium (oxy) oxalate and ammonium oxalate (hereinafter, referred to as "ammonium titanium oxalate"), a double salt of titanium (oxy) oxalate and potassium oxalate, a double salt of titanium (oxy) oxalate and rubidium oxalate and the like. Specific examples of the ammonium titanium oxalate include ammonium titanium dioxalate $[NH_4[Ti(C_2O_4)_2]]$, ammonium titanyl dioxalate $[(NH_4)_2[TiO(C_2O_4)_2]]$, ammonium titanium trioxalate $[(NH_4)_2[Ti(C_2O_4)_3]]$ and the like. Specific examples of the salt of oxalic acid with zirconium include zirconium oxalate $[Zr_2(C_2O_4)_3]$; zirconium oxy oxalate $[(ZrO)_2OC_2O_4]$, ammonium zirconium oxalate $[NH_4[Zr(C_2O_4)_2]$, $(NH_4)_2[ZrO(C_2O_4)_2]$ or $(NH_4)_4[Zr(C_2O_4)_4]]$ and the like. Specific examples of the salt of oxalic acid with hafnium include hafnium oxalate $[Hf_2(C_2O_4)_3]$, hafnium oxy oxalate $[(HfO)_2OC_2O_4]$, ammonium hafnium oxalate $[NH_4[Hf(C_2O_4)_2]$ or $(NH_4)_2[HfO(C_2O_4)_2]]$ and the like. The above-described carboxylic acids, ammonium carboxylates, salts of carboxylic acids and oxalates may be used independently, or two or more of them may be used in combination. Among them, it is preferred to use an ammonium carboxylate, a salt of carboxylic acid with metal selected from Ia group and IIa group and/or a salt of oxalic acid with metal selected from IVa group. It is more preferred to use at least one compound selected from oxalic acid, ammonium oxalate, ammonium hydrogen oxalate, lithium oxalate, lithium hydrogen oxalate, sodium oxalate, sodium hydrogen oxalate, potassium oxalate, potassium hydrogen oxalate, magnesium oxalate, calcium oxalate, strontium oxalate, barium oxalate and a salt of oxalic acid with titanium.

When a carboxylic acid, an ammonium carboxylate and/or a carboxylic acid metal salt is/are included in a ceramics dispersion liquid of the present invention, the amount of the compound(s) contained therein may be no less than about 0.005 time by mole or more based on the molar amount of the ceramics in the dispersion liquid. As the amount of the compound(s) increases, dispersion stability of ceramics in the dispersion liquid and hydrophilic properties of the resulting applied film both improve, which is desirable. Therefore, the amount of the compound(s) is preferably about 0.01 time by mole or more, and more preferably about 0.03 time by mole, based on the molar amount of the ceramics in the dispersion liquid. When the amount increases too much, on the other hand, the improvement in hydrophilic properties (of the resulting applied film) corresponding to the amount increased may not be acquired or the hydrophilic properties may be decreased. Therefore, the amount of the compound(s) is preferably about 400 times by mole, and more preferably about 5 times by mole based on the molar amount of the ceramics in the dispersion liquid.

When a salt of oxalic acid with metal selected from IVa group is included in a ceramics dispersion liquid of the present invention, the amount of the salt of oxalic acid with metal may be about one part by weight to about 50 parts by weight based on 100 parts by weight of the ceramics in the dispersion liquid. When the amount of the salt of oxalic acid is less than about one part by weight, dispersion stability of the ceramics in the dispersion liquid may fall and the hydrophilic properties of the resulting applied film tends to decrease. On the other hand, also when the amount of the salt of oxalic acid exceeds about 50 parts by weight, the hydrophilic properties of the resulting applied film may decrease.

In a ceramics dispersion liquid of the present invention, ceramics are used as a dispersoid, which are dispersed in a dispersion medium. The ceramics included in the ceramics dispersion liquid is in the shape of particle which preferably has a mean particle diameter of about 500 nm or smaller, more preferably has a mean particle diameter of about 200 nm or smaller, and most preferably has a mean particle diameter of about 100 nm or smaller. When the ceramics has a shape of particle which has a mean particle diameter exceeding about 500 nm, the ceramics may precipitate in the dispersion liquid when stored over a long period of time. Examples of the ceramics to be used in the present invention include oxides, nitrides, sulfides, oxynitrides or oxysulfides of metal element such as Ti, Zr, Hf, V, Nb, Ta, Cr, Mo, W, Mn, Tc, Re, Fe, Co, Ni, Ru, Rh, Pd, Os, Ir, Pt, Cu, Ag, Au, Zn, Cd, Ga, In, Tl, Ge, Sn, Pb, Bi, La and Ce. The ceramics may be used independently or two or more of them may be used in combination.

Preferably, as a ceramics, the oxides of Ti, W or Nb is utilized among the above described compounds. More preferably, a titanium oxide [$TiO_2$] is utilized. Among titanium oxide, the titanium oxide having anatase-type crystal structure is more preferably utilized.

When a titanium oxide is used as a ceramics in the present invention, the titanium oxide preferably has index Z of about 0.97 or less, more preferably about 0.95 or less, and most preferably about 0.93 or less, index Z being calculated by equation (III):

$$Z=D/C \quad (III)$$

wherein, among the four-time measurements of X-ray photoelectron spectrum of the titanium oxide, C represents an average value of the half-widths of peaks within the range of binding energy of from 458 eV to 460 eV in the first and second X-ray photoelectron spectra and D represents an average value of the half-widths of peaks within the range of binding energy of from 458 eV to 460 eV in the third and fourth X-ray photoelectron spectra. A ceramics dispersion liquid comprising the titanium oxide having index Z in the above-described range may provide an applied film which shows excellent hydrophilic properties with irradiation of visible light.

Also, when a titanium oxide is used as a ceramics in the present invention, the titanium oxide preferably has index W of about 0.075 or more, more preferably about 0.11 or more and most preferably about 0.145 or more, index W being calculated by equation (IV):

$$W=F/E \quad (IV)$$

wherein E represents an integrated value of absorbance within a wavelength range of from 250 nm to 550 nm along an ultraviolet-visible diffuse reflection spectrum of the titanium oxide, and F represents an integrated value of absorbance within a wavelength range of from 400 nm to 550 nm along the ultraviolet-visible diffuse reflection spectrum. A ceramics dispersion liquid comprising the titanium oxide having index W in the above-described range may provide an applied film which shows excellent hydrophilic properties with irradiation of visible light. When a titanium oxide having index W of less than about 0.075, the titanium oxide tends to absorb a small amount of visible light, which may decrease photocatalytic activities of the titanium oxide with irradiation of visible light. Each of the integrated values, E and F, of absorbance corresponds to an integrated area below the ultraviolet-visible diffuse reflection spectrum of the titanium oxide within the above-designated respective wavelength ranges, the spectrum plotting absorbance in ordinate and wavelength in abscissa.

A method for producing an anatase-type titanium oxide, which is preferably contained in a ceramics dispersion liquid of the present invention, may include a method in which a titanium compound such as a titanium trichloride [$TiCl_3$], a titanium tetrachloride [$TiCl_4$], a titanium sulfate [$Ti(SO_4)_2 \cdot mH_2O$, $0 \leq m \leq 20$], titanium oxysulfate [$TiOSO_4 \cdot nH_2O$, $0 \leq n \leq 20$], titanium oxychloride [$TiOCl_2$] is reacted with a base compound such as sodium hydroxide, potassium hydroxide, sodium carbonate, potassium carbonate, ammonia, hydrazine, hydroxylamine, monoethanolamine, an acyclic amine compound, and an aliphatic amine compound in a pH range of from 2 to 7, or preferably in a pH range of from 3 to 5 to obtain a reaction product thereof, a base compound such as ammonia is added to and mixed with the reaction product, which is then is aged, and subsequently the resulting aged product is washed, followed by being dried and calcined. Alternatively, an anatase-type titanium oxide may be produced by a method in which a titanium compound such as titanium oxysulfate is mixed with hydrogen peroxide to obtain a mixture thereof, ammonia (in an amount exceeding a required amount for converting the titanium compound into a titanium hydroxide) is added into and is reacted with the mixture to obtain a reaction product in the mixture, the resulting solid product is separated from the mixture by a solid-liquid separation, and subsequently the separated solid product is washed, followed by being dried and calcined at in a temperature of from 300° C. to 500° C.

Figure 2:
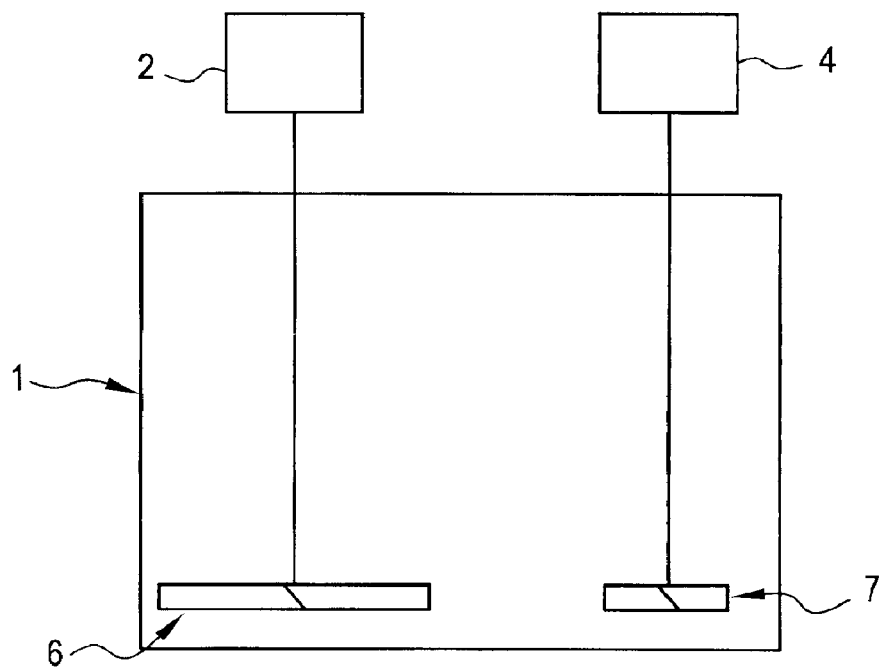
FIG. 2 shows a schematic diagram of another reactor which may be used for obtaining a titanium oxide as a ceramics utilized in the present invention by a reaction of a titanium compound and a base such as ammonia.

Reaction of a titanium compound with a base compound such as ammonia may be conducted using an apparatus as shown in FIG. 1. In this reactor, agitating blades 3, 3 driven by power source 2 and agitating blades 5, 5 driven by power source 4 are provided in container 1. Container 1 has a cylinder-like shape, and power sources 2 and 4 are motors and the like. Agitating blades 3, 3 are placed in the center of container 1, and agitating blades 5, 5 are placed at a place departed from the center of container 1. The diameter of agitating blades 3, 3 is different from that of agitating blades 5, 5. The ratio in diameter of smaller agitating blades to larger agitating blades may be in the range of from 0.1 to 0.9. In FIG. 1, agitating blades 3, 3 having a larger diameter of blade are placed in the center of container 1, and agitating blades 5, 5 having a smaller diameter of blade are placed at circumference of container 1. Using such a container that has agitating blades having blades of different diameters, a ceramics which can be used for preparation of a dispersion liquid may be efficiently prepared. In FIG. 1, as described above, agitating blades having a larger diameter are placed in the center of a container and agitating blades having another diameter are placed in peripheral portion of the container. Alternatively, reaction of a titanium compound with a base compound may be conducted using an apparatus, as shown in FIG. 2, in which larger agitating blade 6 and smaller agitating blade 7 may both be provided in both peripheral portions of container 1. Also, reaction of a titanium compound with a base compound may be conducted using an apparatus (not shown) with three kinds or more of agitating blades which are placed in a container. In this equipment, for example, one kind of agitating blades may be placed in the center of a container and other kinds of agitating blades may be placed at peripheral portions of the container. Moreover, a baffle plate may be installed inside a container. Using a baffle plate, a ceramics may be prepared still more efficiently.

When a titanium oxide is utilized as a ceramics in the present invention, if necessary, a solid acid such as a tungsten oxide, a niobium oxide, an iron oxide and a nickel oxide; a solid base such as a lanthanum oxide, a cerium oxide and a zinc oxide; and/or a compound such as a bismuth oxide and an indium oxide may be utilized with loaded on the titanium oxide.

Here, a description has been given for an example dispersion liquid of which dispersoid is a titanium oxide ceramics. In the present invention, other than titanium oxide may be used as dispersoid. Examples of the ceramics as dispersoid include a niobium oxide ($Nb_2O_5$), a tungstic oxide ($WO_3$), a zinc oxide (ZnO), a zinc sulfide (ZnS) and a tin oxide ($SnO_2$).

A tungsten trioxide ($WO_3$) may be obtained by a method of calcining a tungsten compound such as an ammonium metatungstate. The calcination may be conducted under conditions by which the tungsten compound may be converted into a tungsten trioxide. For example, the calcination can be carried out at a temperature of from 250° C. to 600° C. in air. A niobium oxide ($Nb_2O_5$) may be obtained by a method in which a niobium compound such as a niobium hydrogen oxalate is calcined, or by a method in which a niobium alkoxide such as a niobium penta ethoxide and a niobium penta isopropoxide is dissolved in an alcohol and, into the solution, an acidic solution comprising an inorganic acid and an alcohol is added, the resulting mixture is mixed and is concentrated to obtain a viscous solution and then the solution is calcined.

In a ceramics dispersion liquid of the present invention, a dispersion medium (ii) that disperses the ceramics therein is utilized. Examples of the dispersion medium include various kinds of media, for example, an aqueous medium; an alcoholic media such as ethanol, methanol, 2-propanol and butanol; a ketone-derived media such as acetone and 2-butanone. The dispersion medium to be used is preferably a dispersion medium that dissolves the above-described compound (iii) that is included in a ceramics dispersion liquid, and is suitably selected depending on the compound (iii). When the compound (iii) is a metal salt of oxalic acid, an aqueous medium may be used as a dispersion medium since many of the metal salts are water-soluble. As the aqueous medium, water such as ion exchange water and an aqueous hydrogen peroxide solution maybe utilized. Preferably, ion exchange water is used. Even if a metal salt is slightly soluble in water, the salt may be able to be dissolved in water by using an oxalic acid together.

A ceramics dispersion liquid of the present invention may form an applied film that shows high hydrophilic properties with irradiation of visible light. The applied film may recover hydrophilic properties by irradiation of light and may show hydrophilic properties continuously, even when the whole applied film surface is contaminated with lipophilic materials. The dispersion liquid may comprise materials that improve the hydrophilic properties of the applied film. Examples of such a material include a silica ($SiO_2$) sol and the like.

A ceramics dispersion liquid in the present invention preferably has index X of about 0.175 or less, more preferably about 0.16 or less and most preferably about 0.14 or less, index X being calculated by equation (I):

$$X = T_2/T_1 \quad (I)$$

wherein $T_1$ represents an transmittance at a wavelength of 800 nm in a transmittance spectrum of the ceramics dispersion liquid, and $T_2$ represents an transmittance at a wavelength of 400 nm in the transmittance spectrum. When a ceramics dispersion liquid having index X of about 0.175 or less may provide an applied film which shows excellent hydrophilic properties with irradiation of visible light. $T_1$ and $T_2$ can be obtained by measuring transmittances at 400 mn and 800 mn, respectively, in a transmittance spectrum of a ceramics dispersion liquid solution with an ultraviolet and visible spectrophotometer, the solution being prepared so that the solid content thereof is in the range of from 0.1% by weight to 10% by weight, and is preferably about 0.2% by weight.

Index X reflects transmittance properties of a ceramics dispersion liquid. A small index X means a small transmittance at 400 nm and/or a large transmittance at 800 nm. Transmittance of a ceramics dispersion liquid at a wavelength may vary depending on a content of ceramics in the liquid to be measured. However, a ratio of a transmittance at one wavelength to that at another wavelength is not changed even when a content of ceramics is changed. Therefore, index X of a ceramics dispersion liquid is almost always the same value at any ceramics content therein provided that the dispersion liquid have a content of ceramics for forming a film thereof, for example, a solid content thereof in the range of from 0.1% by weight to 10% by weight.

Also, a ceramics dispersion liquid in the present invention preferably has index Y of about 0.4 or less, more preferably about 0.3 or less and most preferably about 0.2 or less, index Y being calculated by equation (II):

$$Y = A/B \quad (II)$$

wherein A represents an integrated value of transmittance within a wavelength range of from 400 nm to 420 nm along a transmittance spectrum of the titanium oxide, and B represents an integrated value of transmittance within a wavelength range of from 780 nm to 800 nm along the transmittance spectrum, the transmittance spectrum being measured using a solution of the ceramics dispersion liquid which is prepared so that the solid content thereof is in the range of from 0.1% by weight to 10% by weight and is preferably about 0.2% by weight. When a ceramics dispersion liquid having index Y of about 0.4 or more may provide an applied film which shows excellent hydrophilic properties with irradiation of visible light. Each of the integrated values, A and B, of transmittance corresponds to an integrated area below the transmittance spectrum of the ceramics dispersion liquid within the above-designated respective wavelength ranges, the spectrum plotting transmittance in ordinate and wavelength in abscissa.

Furthermore, a ceramics dispersion liquid in the present invention preferably has a maximal intensity at a wavelength of 400 nm or more, more preferably at a wavelength of 450 nm or more and most preferably at a wavelength of 480 nm or more in a primary differential spectrum of the above-described transmittance spectrum of the ceramics dispersion liquid. The maximal intensity is preferably at a wavelength of 760 nm or less, more preferably at a wavelength of 720 nm or less and most preferably at a wavelength of 670 nm or less in the primary differential spectrum. Hereinafter, the primary differential spectrum of the above-described transmittance spectrum of the ceramics dispersion liquid is referred to as "primary differential transmittance spectrum". A ceramics dispersion liquid having a maximal intensity at a wavelength in the above-described range in a primary differential transmittance spectrum thereof may provide an applied film which shows excellent hydrophilic properties with irradiation of visible light.

A ceramics dispersion liquid of the present invention may be produced by mixing the above-described ceramic (i), the above-described dispersion medium (ii) and the above-described compound (iii), and subjecting the resulting mixture to dispersing treatment.

In order to produce a ceramics dispersion liquid of the present invention, a compound that can generate the above-described compound (iii) in a dispersion medium, for example, a hydrate or acid anhydride of the above-described compound (iii) may also be used as compound (iii), instead of using compound (iii) itself. When a hydrate of a salt of carboxylic acid is used, the salt of carboxylic acid would be included in a dispersion medium. When a carboxylic acid anhydride is used, the carboxylic acid would be included in a dispersion medium.

The amount of compound (iii), a hydrate thereof, or acid anhydride to be used may be an amount corresponding to a desired content of compound (iii) in the ceramics dispersion liquid. In view of dispersion of ceramics, it is preferred to use a large amount of compound (iii). This is because a larger content of the compound easily enables the compound to be dispersed. When the compound (iii) is used in an amount of more than the amount corresponding to a desired content, it is preferred that the operation (described below) of removing a part of compound (iii) from the mixture of ceramic (i), dispersion medium (ii) and compound (iii) may be performed after dispersing treatment.

Dispersing treatment may be conducted by an ultrasonic irradiation method, by a method using wet milling, by a method in which hollow portion (cavity) is formed in a mixture of ceramic (i), dispersion medium (ii) and compound (iii) by decompressing the mixture rapidly or by stirring with high-speed rotating blades and a pressure change caused by disappearance of the cavity is utilized, or by a method using shearing stress generated by rotation of agitating blades, screws and the like. These methods may be conducted independently, and two or more of the methods may be used in combination. When a method with ultrasonic irradiation is conducted, dispersing treatment may be conducted under the conditions in which ultrasonic output is one (1) Wh or more (preferably 10 Wh or more) and 10 kWhs or less (preferably three (3) kWh or less), based on one (1) g of ceramic contained therein. When a method using wet milling is conducted, dispersing treatment may be conducted using, as a dispersion medium, beads or balls which are made from a material such as zirconia and alumina. Outside diameter of the dispersion medium is no more than 0.65 mm, preferably no more than 0.5 mm and most preferably no more than 0.3 mm. Dispersing treatment is preferably conducted under the conditions in which a crystal structure of the main component of the ceramics is not substantially changed, that is, under the conditions in which the main component of the ceramics has no phase change and maintains the crystal structure of the ceramics main component wherein the crystal structure is obtained in an X-ray diffraction measurement. For example, dispersing treatment is preferably conducted at a temperature of less than 90° C. In view of maintaining the crystal structure of ceramics, it is preferred that dispersing treatment is conducted at a low temperature, for example, at a temperature of 80° C. or lower, and more preferably at a temperature of 75° C. or more. On the other hand, when a temperature of dispersing treatment is excessively low, stability of the resulting ceramics dispersion liquid may be decreased. Therefore, the temperature is preferably 10° C. or higher, and is more preferably 20° C. or higher.

Period of time for dispersing treatment may be suitably selected depending on a temperature of the dispersing treatment and/or an equipment to be used for the treatment. The period of time may be no less than one (1) minute, preferably no less than one (1) hour, and may be no more than 50 hours, preferably no more than 24 hours. Dispersing treatment may be conducted in two or more steps.

The resulting mixture obtained after dispersing treatment may be subjected, if needed, to removal operation of large particles by centrifugal separation, or to adjustment operation of ceramic content by dilution. When the compound (iii) is used in an amount of more than the amount corresponding to a desired content, it is preferred that the operation of removing a part of compound (iii) from the mixture may be performed to adjust the content of ceramics therein to a predetermined content. The removal operation of compound (iii) may be conducted by irradiation of light, by heating, by addition of oxidizing agent or reducing agent, by treatment with ion exchange membrane, by ozonization, by hydrothermal treatment or the like. Furthermore, the mixture obtained after dispersing treatment may be subjected, if needed, to adjusting operation of pH by adding an acid or a base. Examples of the acid to be used here include hydrochloric acid, nitric acid, phosphoric acid, sulfuric acid and the like. Examples of the base to be used here include ammonia, urea, hydrazine, lithium hydroxide, sodium hydroxide, potassium hydroxide, cesium hydroxide, rubidium hydroxide and the like. The acid and base may be added at the time of the dispersing treatment.

The content of ceramics in a dispersion liquid may be suitably determined depending on the kind of target material on which the dispersion liquid is applied and/or a desired thickness of the applied film to be made from the dispersion liquid. The content of ceramics may be no less than about 0.1% by weight, is preferably no less than about one (1) % by weight, and may be no more than about 30% by weight, is preferably no more than about 10% by weight, based on the dispersion liquid.

Thus obtained ceramics dispersion liquid may be applied and dried on a material such as glass, plastics, metals, and potteries to obtain a ceramic applied film on the material.

A ceramics dispersion liquid of the present invention is preferably stored under the conditions not exposed to visible light. For example, the dispersion liquid is preferably stored in a darkroom, or in a shading container through which no more than 10% of ultraviolet rays and visible light transmit. When a ceramics dispersion liquid of the present invention is stored in a transparent glass container, which is placed under a lighting equipment in a room for a long period of time, it may be difficult to form a flat and smooth applied film using the resulting dispersion liquid.

A ceramics dispersion liquid of the present invention may be used as a hydrophilic coating agent.

The hydrophilic coating agent comprising a ceramics dispersion liquid of the present invention is useful for giving a hydrophilic surface to a material such as glass, plastics, metals and potteries. A hydrophilic coating agent in the present invention may be a hydrophilic coating agent in which an effective ingredient is a ceramics dispersion liquid of the present invention. The hydrophilic coating agent in the present invention may contain an inorganic compound other than a ceramics (i) which is included in a dispersion liquid of the present invention, and/or an organic compounds other than compound (iii) which is included in a dispersion liquid of the present invention, depending on usage and object of the hydrophilic coating agent. The inorganic compound and the organic compound may be granular materials, or may be liquid materials. The inorganic compound may include an adsorbent and the like. Specifically, examples of the inorganic compound include a silica, an alumina, a zeolite, a molecular sieve, an activated carbon, a magnesia, a calcium phosphate, a hydroxide of metallic element such as Ti, Zr, Hf, V, Nb, Ta, Cr, Mo, W, Mn, Tc, Re, Fe, Co, Ni, Ru, Rh, Pd, Os, Ir, Pt, Cu, Ag, Au, Zn, Cd, Ga, In, Tl, Ge, Sn, Pb, Bi, La and Ce, and an amorphous oxide of the metallic element. The above-described organic compound may include a binder, a sililation reagent, and a surfactant and the like. A hydrophilic coating agent in the present invention may be applied or coated on a surface of material as it is, or may be applied or coated on the surface of material after being mixed with the above-described inorganic compound or organic compound. Using a hydrophilic coating agent in the present invention, hydrophilic properties may be provided to a surface of material such as glass, plastic, metal and pottery, for example, in a method in which a hydrophilic coating agent is applied to a surface of material, which is then maintained in air at a temperature of from a room temperature (about 20° C.) to 200° C. to form an applied film on the material surface, and subsequently light is irradiated to the applied film; or in a method in which a hydrophilic coating agent is applied to a surface of material, to which hot air having a temperature of from 80° C. to 200° C. is blown to form an applied film on the material surface, and light is irradiated to the applied film. The irradiation of light may be conducted, for example, using a mercury-vapor lamp, a cold cathode discharge tube (such as a fluorescent lamp and a black light), a halogen lamp, a sodium lamp, a light emitting diode, an EL lamp, a gas lamp or the like. Alternatively, the irradiation of light may be conducted by placing the applied film in open air in the daytime.

A hydrophilic coating agent comprising a ceramics dispersion liquid of the present invention provides an applied film thereof, and also provides a photocatalytic functional product comprising the applied film. The photocatalytic functional product may have an applied film with hydrophilic properties on its surface.

An applied film (which may be on a photocatalytic functional product) in the present invention shows hydrophilic properties with irradiation of visible light. Specifically, the applied film may have properties such that, when an acetone solution containing oleic acid is applied and is dried on a surface of the applied film and then the film is irradiated with visible light in air at a temperature of about 25° C. for 24 hours using a 500 W xenon lamp in which light with a wavelength of no more than 430 nm is cut, the film has a water contact angle of no more than 45°, preferably of no more than 35° and more preferably of no more than 10°. Water contact angle is a contact angle which can be measured, when water is placed on a film, as the angle between the surface of the water and the surface of the film at the line of contact. If a water contact angle of the applied film in the above-described evaluation method exceeds 45°, it may be difficult for the photocatalytic functional product to show sufficient anticlouding effects or self-cleaning effects when irradiated with lighting equipment in general habitation environment.

A photocatalytic functional product in the present invention may have an applied film (comprising a ceramics dispersion liquid of the present invention) with a thickness of from 0.02 μm to 1 μm, preferably with a thickness of from 0.1 μm to 1 μm, on its surface. When the applied film is activated with light irradiation using lighting equipment (which is usually utilized inside a house) or the like, the applied film shows hydrophilic properties, which prevents from being soiled. When the applied film is placed on window glass, a mirror, a washstand or the like, an anticlouding effect is also provided thereon by the applied film.

A photocatalytic functional product may be obtained by a method, for example, of applying a ceramics dispersion liquid of the present invention onto window glass, a mirror, a washstand or the like, followed by being dried. The applying of the ceramics dispersion liquid may be conducted by spin coating, dip coating, doctor blade coating, spraying, brush coating or the like. The drying of the ceramics dispersion liquid may be conducted by a dryer, or by air drying using a ceramics dispersion liquid of which dispersion medium is a highly volatile solvent. The drying temperature is appropriately selected depending on a ceramics dispersion liquid to be used, and may be in the range of from room temperature (about 20° C.) to about 200° C.

Using a ceramics dispersion liquid or a hydrophilic coating agent of the present invention, hydrophilic properties may be given to surface of material such as glass, plastic, metal and pottery. Moreover, according to a method for producing a ceramics dispersion liquid of the present invention, the ceramics dispersion liquid having the hydrophilic properties may be easily manufactured. Furthermore, since a photocatalytic functional product obtained by the present invention may not be easily polluted or clouded, the product has no need to be washed so often.

The invention being thus described, it will be apparent that the same may be varied in many ways. Such variations are to be regarded as within the spirit and scope of the invention, and all such modifications as would be apparent to one skilled in the art are intended to be within the scope of the following claims.

The entire disclosure of Japanese Patent Application No. 2001-219492 filed on Jul. 19, 2001, Japanese Patent Application No. 2001-219493 filed on Jul. 19, 2001, Japanese Patent Application No. 2001-349770 filed on Nov. 15, 2001 and Japanese Patent Application No. 2001-391186 filed on Dec. 25, 2001, all indicating specification, claims, drawings and summary, are incorporated herein by reference in their entirety.

EXAMPLE

The present invention is described in more detail by following Examples, which should not be construed as a limitation upon the scope of the present invention.

Transmittance of a dispersion liquid, an integrated value along a transmittance spectrum of a dispersion liquid, a wavelength at which a dispersion liquid has a maximal intensity in a primary differential transmittance spectrum of the dispersion liquid, a mean particle diameter of a titanium oxide, crystal structure of a titanium oxide, X-ray photoelectron spectroscopy (XPS) spectrum of a titanium oxide and an integrated value of absorbance of a titanium oxide were obtained by the following methods. Also, hydrophilic property evaluation of applied film was conducted by the following methods.

Transmittance (%) and Integrated Value along Transmittance Spectrum:

A transmittance spectrum of a sample dispersion liquid was obtained using a solution of the dispersion liquid having a solid content of 0.2% by weight and a barium sulfate solution (as a standard white board), each of which is placed in a quartz cell (1 cm long, 1 cm wide and 4.5 cm high), with an ultraviolet and visible spectrophotometer (trade name: UV-2500PC, manufactured by Shimadzu Corporation) having an integrating sphere. Using the transmittance spectrum, a transmittance $T_1$ (%) at 800 nm and a transmittance $T_2$ (%) at 400 nm were obtained. Also, an integrated value A of transmittance (within a wavelength range of from 400 nm to 420 nm) and an integrated value B of transmittance (within a wavelength range of from 780 nm to 800 nm), each of which is along the transmittance spectrum, were obtained.

Wavelength (nm) at which a Primary Differential Transmittance Spectrum has a Maximal Intensity:

Using software installed in an ultraviolet and visible spectrophotometer (trade name: UV-2500PC, manufactured by Shimadzu Corporation), a primary differential transmittance spectrum of a sample dispersion liquid was obtained by differentiating the above-obtained transmittance spectrum with respect to wavelength λ in the range of from 400 nm to 760 nm under the condition of Δλ=40 nm. Using the software, a wavelength at which the dispersion liquid has a maximal intensity in the primary differential transmittance spectrum was obtained.

Mean Particle Diameter (nm):

Using a sub-micron particle size distribution measuring apparatus (trade name "N4Plus", manufactured by Coulter Inc.), a particle-size distribution of a sample was measured. From the distribution, was obtained an accumulated diameter of 50% by weight, which is used as a mean particle diameter of the sample.

Crystal Structure:

Using an X-ray diffraction equipment (trade name "RAD-IIA", manufactured by Rigaku Corporation), an X-ray diffraction spectrum of a sample was obtained. Using the X-ray diffraction spectrum, a crystal structure of the main component of the sample was obtained.

XPS Spectrum:

XPS spectra of a sample showing an electron state of titanium were obtained four times (together with the XPS spectra showing an electron state of oxygen or carbon) using an X-ray photoelectron spectrophotometer (trade name: XPS-7000, manufactured by RIGAKU CORPORATION) and a X-ray source of MgKα under the condition in that an out put is 8 kV and 30 mA, a scan mode is narrow scan, a pass E is 10 eV, a step E is 0.04 eV, vacuum degree is $5\times10^{-6}$ Pa, a measuring temperature is a room temperature, Ti2p peak correction is conducted at C1s=284.6 eV and the sample is supported with carbon tape. Specifically, an XPS spectrum of a sample showing an electron state of titanium was measured twice (1st and 2nd measurements) for 60 seconds in each measurement; then an XPS spectrum showing an electron state of oxygen was measured twice for 56 seconds in each measurement; then an XPS spectrum showing an electron state of carbon was measured twice for 80 seconds in each measurement; then again an XPS spectrum showing an electron state of titanium was measured twice (3rd and 4th measurements) for 60 seconds in each measurement. Average value C of the half-widths of peaks in the first and second XPS spectra and average value D of the half-widths of peaks in the third and fourth X-ray photoelectron spectra were calculated.

Integrated Value of Absorbance:

A sample dispersion liquid was dried to obtained dried powder. An ultraviolet-visible diffuse reflection spectrum of the dried powder was obtained using barium sulfate as a standard white board with an ultraviolet and visible spectrophotometer (trade name: UV-2500PC, manufactured by Shimadzu Corporation) having an integrating sphere. An integrated value E of absorbance (within a wavelength range of from 220 nm to 550 nm) and an integrated value F of absorbance (within a wavelength range of from 400 nm to 550 nm), each of which is along the ultraviolet-visible diffuse reflection spectrum, were obtained.

Figure 3:
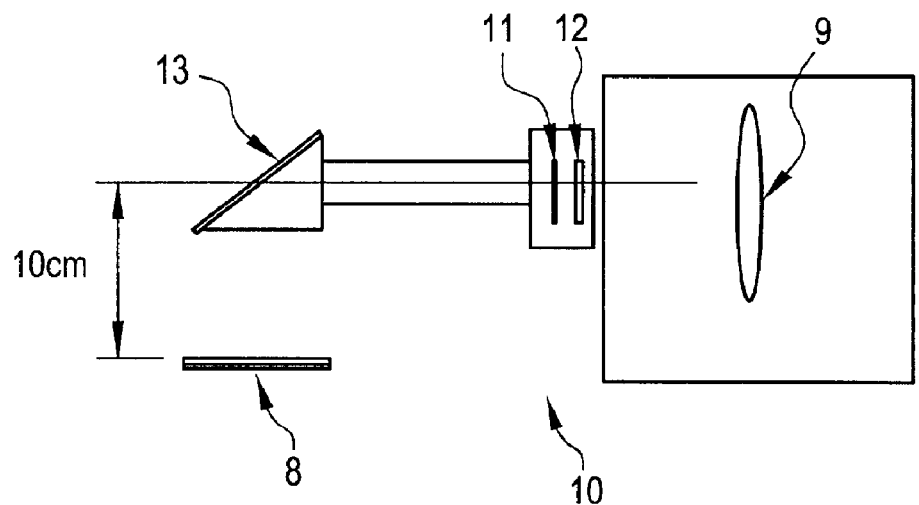
FIG. 3 shows one example of an apparatus and a light source equipment which may be used for a hydrophilic-property evaluation of an applied film made from a hydrophilic coating agent comprising a ceramics dispersion liquid in the present invention (see, EXAMPLE below).

Hydrophilic Property Evaluation:

An acetone solution of 0.05% by weight of oleic acid was applied onto a sample. The sample was rotated using a spin coater (trade name: 1H-D3, manufactured by MIKASA) by 3000 rpm for 5 seconds and subsequently by 7000 rpm for 60 seconds to remove an excessive acetone solution of oleic acid therefrom. The resulting sample was dried at 110° C. to obtain a specimen. (In Example 5 and Comperative Example 2, an acetone solution of 0.2% by weight of oleic acid was further applied on the dried sample, and an excessive acetone solution of oleic acid was removed in the same manner as described above using the spin coater, and then, the sample was dried again at 110° C. to obtain a specimen.) Subsequently, visible light irradiation was conducted to the specimen. Before and after the irradiation of light, water contact angle between the water and the surface of the specimen was measured using a water contact angle meter (Model: CA-A type, manufactured by KYOWA INTERFACE SCIENCE CO., LTD.). Using the water contact angle, hydrophilic properties of the sample were evaluated. Smaller water contact angle represents higher hydrophilic properties of the sample. It is noted that the irradiation of light was conducted at a temperature of 25° C. using an apparatus as shown in FIG. 3. In FIG. 3, the irradiation of light was carried out using a light source device 10 (trade name: Optical Modulex SX-UI500XQ, manufactured by USHIO INC.) which is equipped with a 500 W xenon lamp 9 (trade name: Lamp UXL-500SX, manufactured by USHIO INC.), an ultraviolet cutting filter 11 (trade name: L-42, manufactured by Asahi Techno Glass Co., Ltd.) cutting off ultraviolet light having a wavelength of about 400 nm or shorter and an infrared light cutting filter 12 (trade name: Supercold Filter, manufactured by USHIO INC.) cutting off infrared light having a wavelength of about 830 nm or longer. Space between specimen 8 and attachment mirror 13 of light source device was set 10 cm.

Example 1

Ttitanium oxysulfate (3388 g) (manufactured by Tayca Corporation) was dissolved in water (2258 g). Into the resulting solution, 35% by weight of an aqueous hydrogen peroxide solution (1309 g) (manufactured by Kishida Chemical Co., Ltd.) was added to prepare a mixed solution thereof. Ion exchange water (4700 g) was supplied into a reaction container equipped with a pH electrode and a pH controller that is connected with the pH electrode and that has a function of supplying 25% by weight of an aqueous ammonia solution (extra-pure reagent, manufactured by Wako Pure Chemical Industries) for uniformly adjusting pH. A pH value of the controller was set to 4, and a pH value of the ion exchange water in the reaction container was adjusted to the setting value 4 using a dilute sulfuric acid. A rate of supplying the aqueous ammonia solution was set to 17.9 ml/min. The pH controller works such that when a pH value of a liquid in the container becomes lower than a setting pH value, the aqueous ammonia solution is supplied continuously at the above-described rate until the pH value of the liquid reaches the setting value. The mixed solution prepared above was supplied into the reaction container at a rate of 14.9 ml/min. under agitation of 117 rpm, while being reacted with the aqueous ammonia solution that was supplied by the pH controller into the reaction container, to obtain a reaction product in the mixture. The reaction temperature was in the range of from 23° C. to 35° C. The mixture was maintained for one (1) hour, with stirring. Then, into the mixture, 25% by weight of an aqueous ammonia solution (extra-pure reagent, manufactured by Wako Pure Chemical Industries) was supplied to obtain a slurry. The total amount of the aqueous ammonia solution supplied to the reaction container was 3746 g, that was twice as large as the amount required for converting the titanium oxysulfate into a titanium hydroxide. The slurry was then filtrated to obtain the reaction product therein. The reaction product was washed with ion exchange water, and was dried to obtain a powder. The powder was calcined in air at a temperature of 370° C. for one (1) hour, and subsequently was cooled to a room temperature, to obtain a particle-shaped anatase-type titanium oxide having 15% by weight of moisture content.

Oxalic acid dihydrate [$C_2H_2O_4 \cdot 2H_2O$] (1.58 g) (reagent for sulfur dioxide automatic analysis machines, manufactured by Wako Pure Chemical Industries) was dissolved in water (88.42 g). Into the resulting aqueous oxalic acid solution, the above-obtained particle-shaped anatase-type titanium oxide (10 g) was added and mixed with each other.

The amount of the oxalic acid dihydrate used here was 0.1 time by mole based on the titanium oxide. The resulting mixture was subjected to dispersing treatment at a temperature of 20° C. for 3 hours using a medium agitation-type grinder (trade name: 4TSG-1/8, manufactured by Igarashi Machine Co.,) containing beads made of zirconia having an outside diameter of 0.3 mm as medium, to obtain a titanium oxide dispersion liquid. The dispersion liquid contained a solid of which mean particle diameter was 82.5 nm, and had 10% by weight of a solid content. The solid was a titanium oxide of which crystal structure was anatase type.

Figure 4:
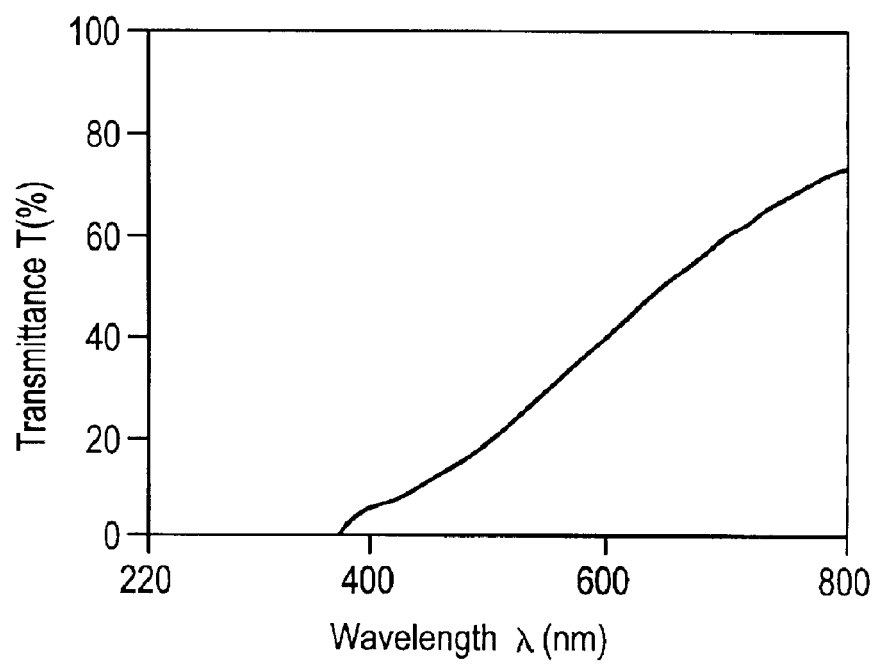
FIGS. 4, 7, 9 and 14 show transmittance spectra of ceramic dispersion liquids of the present invention.
Figure 5:
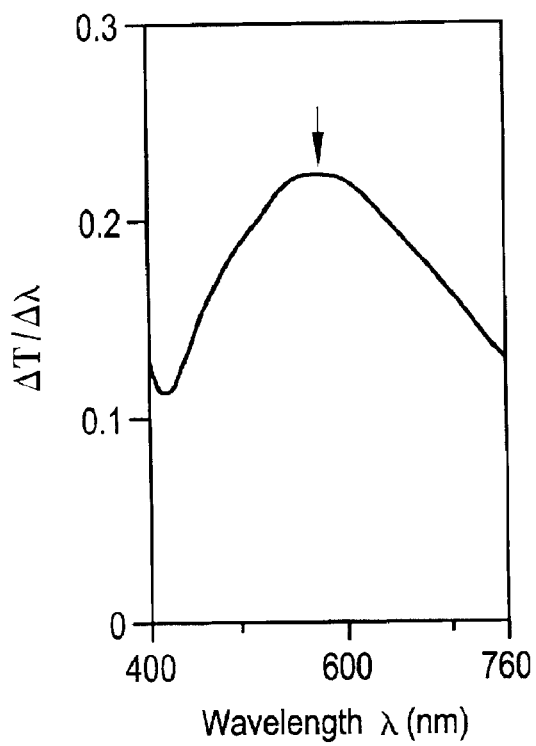
FIGS. 5, 8, 10 and 15 show primary differential transmittance spectra of titanium oxide dispersion liquids of the present invention.

Into a part of the obtained titanium oxide dispersion liquid, water was added so as to prepare a dispersion liquid having a solid content of 0.2% by weight. Using the prepared dispersion liquid, a transmittance spectrum of the titanium oxide dispersion liquid was measured. The transmittance spectrum is shown in FIG. 4. Transmittances $T_1$ and $T_2$, integrated values A and B, index X (=$T_2/T_1$) and index Y (=A/B) of the transmittance spectrum are shown in Table 1. The transmittance spectrum was differentiated to obtain a primary differential transmittance spectrum of the titanium oxide dispersion liquid. The primary differential transmittance spectrum is shown in FIG. 5. The wavelength at which the primary differential transmittance spectrum has a maximal intensity is shown in Table 1.

A part of the obtained titanium oxide dispersion liquid was dried in air at a temperature of 150° C. to obtain a powder thereof. Using the powder, XPS spectra of the titanium oxide dispersion liquid were obtained. Average value C of the half-widths of peaks in the first and second XPS spectra, average value D of the half-widths of peaks in the third and fourth XPS spectra, index Z (=D/C), a peak position (i.e., a binding energy shown by the peak) in the integrated spectrum of the first and second XPS spectra and a peak position in the integrated spectrum of the third and fourth XPS spectra are shown in Table 2. Also, using the above-obtained powder of the titanium oxide dispersion liquid, an ultraviolet-visible diffuse reflection spectrum of the dispersion liquid was measured. Integrated values E and F of absorbance along the ultraviolet-visible diffuse reflection spectrum and index W (=F/E) are shown in Table 2.

Into a part of the obtained titanium oxide dispersion liquid, water was added to obtain a dispersion liquid having a solid content of 2% by weight. The dispersion liquid was applied onto a slide glass having a length of 76 mm, a width of 26 mm and a thickness of one (1) mm. The slide glass was rotated using a spin coater (trade name: 1H-D3, manufactured by MIKASA) at 300 rpm for 5 seconds and subsequently at 500 rpm for 30 seconds, to remove an excessive dispersion liquid therefrom. Then, the slide glass was dried at 110° C. The above-described applying and drying operation of the dispersion liquid on the slide glass was repeated two times, to form an applied film of the titanium oxide dispersion liquid on whole one side of the slide glass. Then, after the slide glass was irradiated with black light, the slide glass was stored under darkness.

Figure 6:
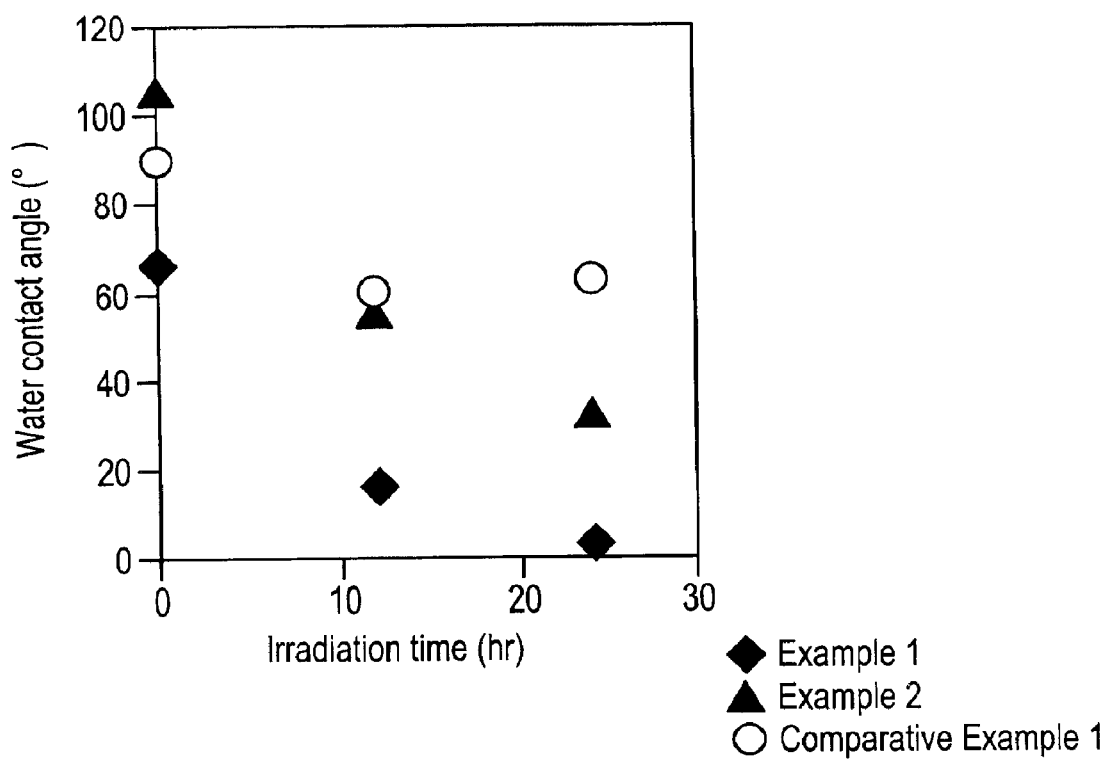
FIGS. 6 and 16 show hydrophilic properties of the applied films which were made from the titanium oxide dispersion liquids of the present invention and of the applied films which were made from commercially available titanium oxide photocatalyst coating agents.

For hydrophilic property evaluation, an acetone solution of oleic acid was applied onto the slide glass (as mentioned above) to obtain a specimen of the applied film. Before and after 12- and 24-hour irradiation, hydrophilic properties of the applied film were evaluated. The results are shown in Table 3 and FIG. 6.

Example 2

A titanium oxide dispersion liquid was obtained in the same manner as in Example 1 except that an aqueous ammonium oxalate solution (90 g) (in which ammonium oxalate monohydrate (3.56 g) [$(NH_4)_2C_2O_4 \cdot H_2O$] (extra-pure reagent, manufactured by Wako Pure Chemical Industries) was dissolved in water (86.44 g)) was used, instead of using an aqueous oxalic acid solution. The amount of the ammonium oxalate monohydrate used here was 0.2 time by mole based on the titanium oxide to be used. The dispersion liquid contained a solid of which mean particle diameter was 172.3 nm, and had 10% by weight of a solid content. The solid was a titanium oxide of which crystal structure was anatase type.

Figure 7:
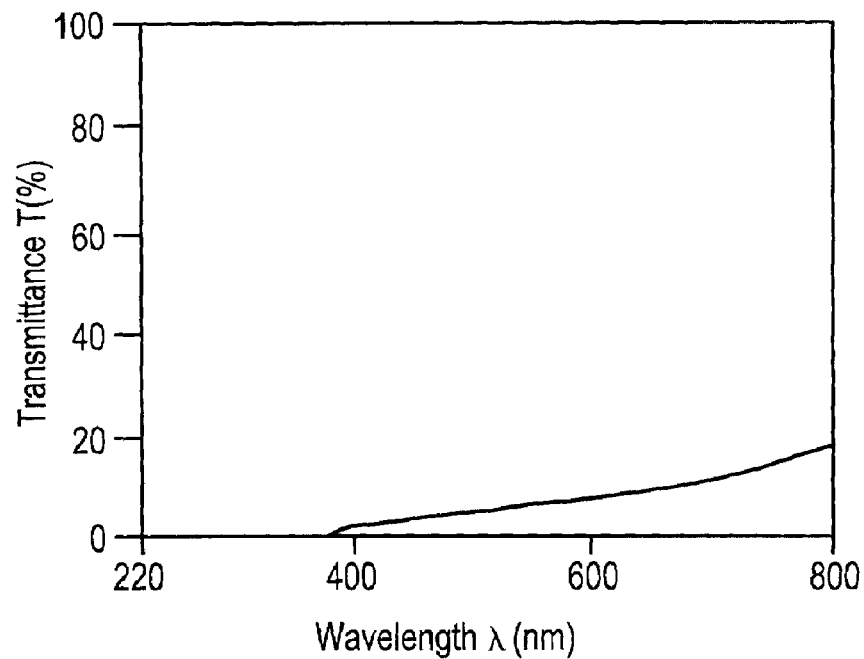
Figure 8:
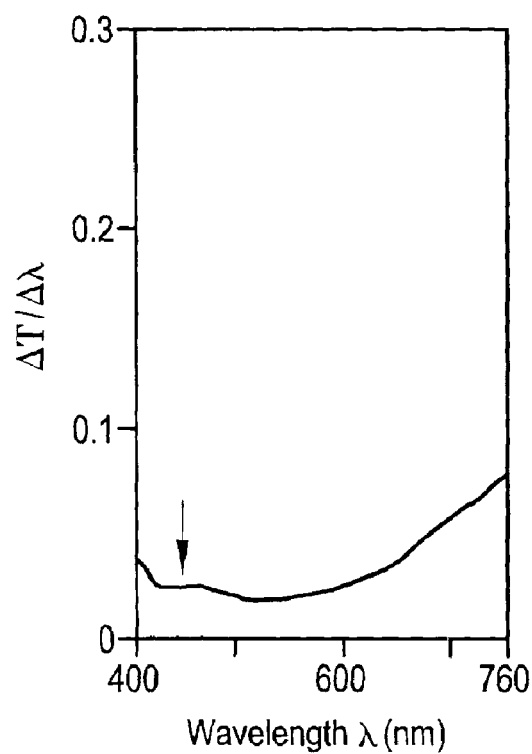

Into a part of the obtained titanium oxide dispersion liquid, water was added so as to prepare a dispersion liquid having a solid content of 0.2% by weight. Using the prepared dispersion liquid, a transmittance spectrum of the titanium oxide dispersion liquid was measured. The transmittance spectrum is shown in FIG. 7. Transmittances $T_1$ and $T_2$, integrated values A and B, index X and index Y of the transmittance spectrum are shown in Table 1. The transmittance spectrum was differentiated to obtain a primary differential transmittance spectrum of the titanium oxide dispersion liquid. The primary differential transmittance spectrum is shown in FIG. 8. The wavelength at which the primary differential transmittance spectrum has a maximal intensity is shown in Table 1.

A part of the obtained titanium oxide dispersion liquid was dried in air at a temperature of 150° C. to obtain a powder thereof. Using the powder, XPS spectra of the titanium oxide dispersion liquid were obtained. Average values C and D of the half-widths, index Z, a peak position in the integrated spectrum of the first and second XPS spectra and a peak position in the integrated spectrum of the third and fourth XPS spectra are shown in Table 2. Also, using the above-obtained powder of the titanium oxide dispersion liquid, an ultraviolet-visible diffuse reflection spectrum of the dispersion liquid was measured. Integrated values E and F of absorbance and index W are shown in Table 2.

An applied film was formed on whole one side of a slide glass in the same manner as in Example 1 except that the above-described titanium oxide dispersion liquid was used, instead of using the dispersion liquid obtained in Example 1.

Hydrophilic properties of the applied film were evaluated. The results are shown in Table 3 and FIG. 6.

Example 3

Titanium oxysulfate (3388 g) (manufactured by Tayca Corporation) was dissolved in water (2258 g) to prepare an aqueous titanium oxysulfate solution. Ion exchange water (4700 g) was supplied into a reaction container equipped with a pH electrode and a pH controller that is connected with the pH electrode and that has a function of supplying 25% by weight of an aqueous ammonia solution (extra-pure reagent, manufactured by Wako Pure Chemical Industries) for uniformly adjusting pH. A pH value of the controller was set to 4, and a pH value of the ion exchange water in the reaction container was adjusted to the setting value 4 using a dilute sulfuric acid. A rate of supplying the aqueous ammonia solution was set to 18 ml/min. The pH controller works such that when a pH value of a liquid in the container becomes lower than a setting pH value, the aqueous ammonia solution is supplied continuously at the above-described rate until the pH value of the liquid reaches the setting value. The above prepared aqueous titanium oxysulfate solution was supplied into the reaction container at a rate of 12 ml/min. under agitation of 107 rpm, while being reacted with the aqueous ammonia solution that was supplied by the pH controller into the reaction container, to obtain a reaction product in the resulting mixture. The mixture was maintained for one (1) hour, with stirring. Then, into the mixture, 25% by weight of an aqueous ammonia solution (extra-pure reagent, manufactured by Wako Pure Chemical Industries) was supplied to obtain a slurry. The total amount of the aqueous ammonia solution supplied to the reaction container was 3746 g, that was twice as large as the amount required for converting the titanium oxysulfate into a titanium hydroxide. The slurry was then filtrated to obtain the reaction product therein. The reaction product was washed with ion exchange water, and was dried to obtain a powder. The powder was calcined in air at a temperature of 425° C. for one (1) hour, and subsequently was cooled to a room temperature, to obtain a particle-shaped anatase-type titanium oxide having 15% by weight of moisture content.

Ammonium paratungstate pentahydrates [$(NH_4)_{10}W_{12}O_{41} \cdot 5H_2O$] (111.11 g) (manufactured by Wako Pure Chemical Industries) was dissolved in ion exchange water (3089 g) to prepare an aqueous ammonium paratungstate solution. Into the aqueous ammonium paratungstate solution, the above-obtained particle-shaped anatase-type titanium oxides (800 g) was added, and the resulting mixture was stirred for 20 minutes at an ordinary temperature under atmospheric pressure. Subsequently, water was evaporated from the mixture, while being stirred, at 55° C.–60° C. under a reduced pressure. Then, the dried mixture was calcined in air at a temperature of 425° C. for one (1) hour to obtain a tungstic oxide loaded on a titanium oxide. The amount of the tungstic oxide in/on the titanium oxide was five (5) % by mole in terms of tungsten based on the titanium oxide.

A titaniumoxide (loading the tungstic oxide) dispersion liquid was obtained in the same manner as in Example 1 except that the above-obtained tungstic oxide loaded on a titanium oxide (10 g) was used, instead of using the particle-shaped anatase-type titanium oxide obtained in Example 1. The amount of the oxalic acid dihydrate used here was 0.1 time by mole based on the titanium oxide to be used. The dispersion liquid contained a solid of which mean particle diameter was 93.1 nm, and had 10% by weight of a solid content. The solid was a titanium oxide of which crystal structure was anatase type.

Figure 9:
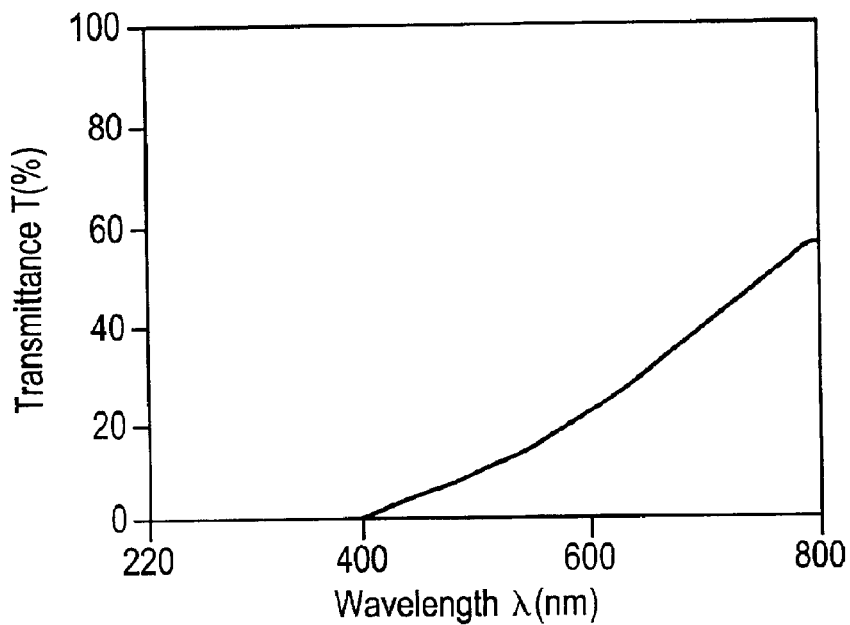
Figure 10:
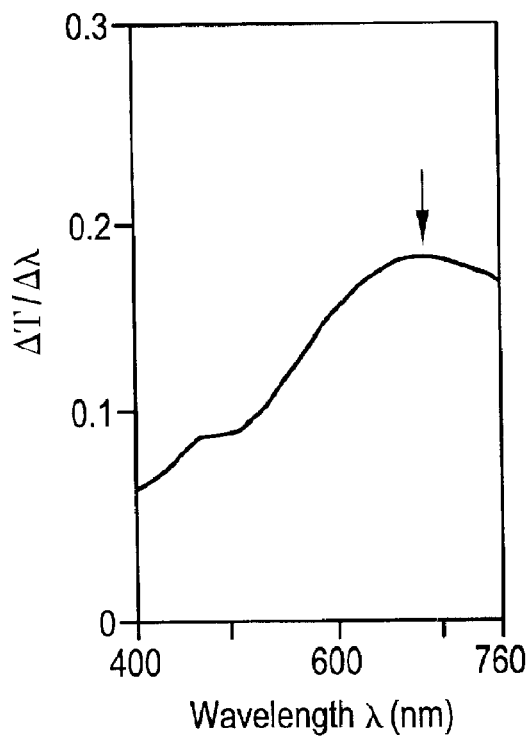

Into a part of the obtained titanium oxide dispersion liquid, water was added so as to prepare a dispersion liquid having a solid content of 0.2% by weight. Using the prepared dispersion liquid, a transmittance spectrum of the titanium oxide dispersion liquid was measured. The transmittance spectrum is shown in FIG. 9. Transmittances $T_1$ and $T_2$, integrated values A and B, index X and index Y of the transmittance spectrum are shown in Table 1. The transmittance spectrum was differentiated to obtain a primary differential transmittance spectrum of the titanium oxide dispersion liquid. The primary differential transmittance spectrum is shown in FIG. 10. The wavelength at which the primary differential transmittance spectrum has a maximal intensity is shown in Table 1.

A part of the obtained titanium oxide (loading the tungstic oxide) dispersion liquid was dried in air at a temperature of 150° C. to obtain a powder thereof. Using the powder, XPS spectra of the titanium oxide dispersion liquid were obtained. Average values C and D of the half-widths, index Z, a peak position in the integrated spectrum of the first and second XPS spectra and a peak position in the integrated spectrum of the third and fourth XPS spectra are shown in Table 2. Also, using the above-obtained powder of the titanium oxide dispersion liquid, an ultraviolet-visible diffuse reflection spectrum of the dispersion liquid was measured. Integrated values E and F of absorbance and index W are shown in Table 2.

An applied film was formed on whole one side of a slide glass in the same manner as in Example 1 except that the above-described titanium oxide (loading the tungstic oxide) dispersion liquid was used, instead of using the dispersion liquid obtained in Example 1.

Hydrophilic properties of the applied film were evaluated. The results are shown in Table 3.

Comparative Example 1

Figure 11:
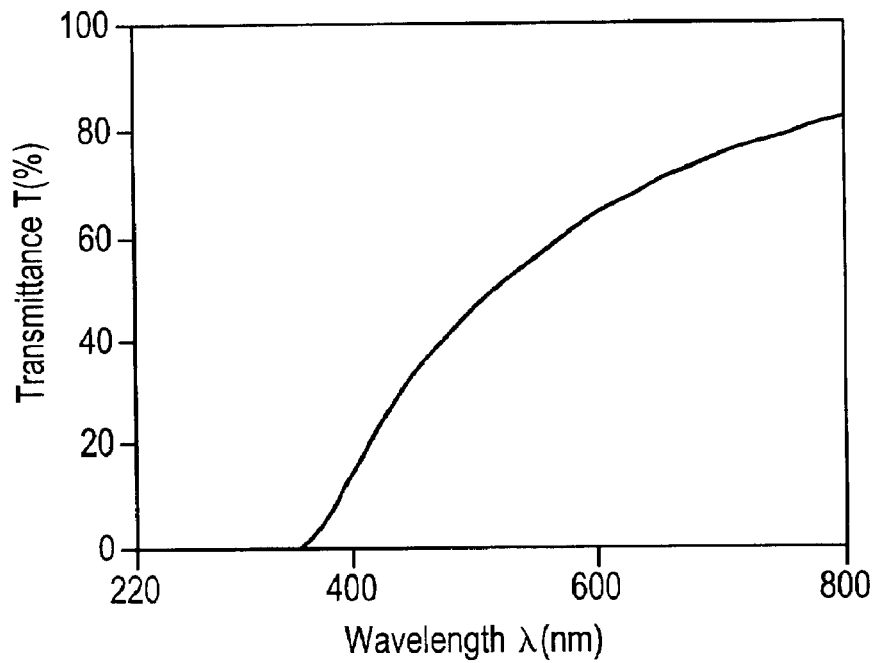
FIGS. 11 and 17 show transmittance spectra of dispersion liquids which were made from commercially available titanium oxide photocatalyst coating agents.
Figure 12:
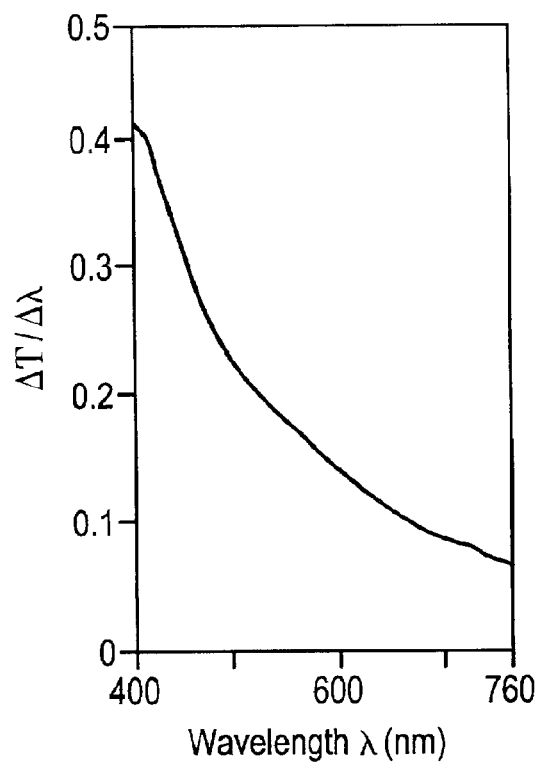
FIGS. 12 and 18 show primary differential transmittance spectra of dispersion liquids which were made from commercially available titanium oxide photocatalyst coating agents.

Into a commercially available photocatalytic titanium oxide coating agent consisting of titanium oxide and water (trade name: TKC-302, solid content: 2.3% by weight, mean particle diameter of the titanium oxide in the coating agent: 54 nm, manufactured by Tayca Corporation), water was added so as to prepare a dispersion liquid having a solid content of 0.2% by weight. Using the prepared dispersion liquid, a transmittance spectrum of the coating agent was measured. The transmittance spectrum is shown in FIG. 11. Transmittances $T_1$ and $T_2$, integrated values A and B, index X and index Y of the transmittance spectrum are shown in Table 1. The transmittance spectrum was differentiated to obtain a primary differential transmittance spectrum of the coating agent. The primary differential transmittance spectrum is shown in FIG. 12. The wavelength at which the primary differential transmittance spectrum has a maximal intensity is shown in Table 1.

An applied film was formed on whole one side of a slide glass in the same manner as in Example 1 except that the above-described commercially available titanium oxide photocatalyst coating agent (trade name: TKC-302 was used, instead of using the dispersion liquid obtained in Example 1.

Hydrophilic properties of the applied film were evaluated. The results are shown in Table 3 and FIG. 6.

TABLE 1

| | Example 1 | Example 2 | Example 3 | Comparative Example 1 |
|---|---|---|---|---|
| Transmittance $T_1$ (%) | 73.88 | 19.56 | 56.72 | 83.29 |
| Transmittance $T_2$ (%) | 5.48 | 1.58 | 1.59 | 15.25 |
| Index X (= $T_2/T_1$) | 0.074 | 0.081 | 0.028 | 0.183 |
| Integrated value A | 129.3 | 38.8 | 45.3 | 389.1 |
| Integrated value B | 1455 | 373 | 1104 | 1654 |
| Index Y (= A/B) | 0.089 | 0.104 | 0.041 | 0.235 |
| Wavelength (nm) at which a primary differential transmittance spectrum has a maximal intensity | 577 | 448 | 687 | None |

TABLE 2

| | Example 1 | Example 2 | Example 3 |
|---|---|---|---|
| Average value C (eV) of the half-widths | 1.51 | 1.44 | 1.61 |
| Average value D (eV) of the half-widths | 1.36 | 1.37 | 1.40 |
| Index Z (= D/C) | 0.90 | 0.95 | 0.87 |

TABLE 2-continued

|  | Example 1 | Example 2 | Example 3 |
|---|---|---|---|
| Peak position (eV) in the integrated spectrum of the first and second XPS spectra | 458.5 | 458.2 | 458.9 |
| Peak position (eV) in the integrated spectrum of the third and fourth XPS spectra | 458.3 | 458.1 | 458.5 |
| Integrated value E | 210.4 | 207.3 | 216.5 |
| Integrated value F | 34.7 | 30.8 | 41.8 |
| Index W (= F/E) | 0.165 | 0.149 | 0.193 |

TABLE 3

|  | Example 1 | Example 2 | Example 3 | Comparative Example 1 |
|---|---|---|---|---|
| Water contact angle (°) before light irradiation | 66 | 106 | 64 | 90 |
| Water contact angle (°) after light irradiation for 12 hours | 16 | 56 | — | 60 |
| Water contact angle (°) after light irradiation for 24 hours | No more than 5 | 32 | 24 | 62 |

Example 4

Titanium oxysulfates (3388 g) (manufactured by Tayca Corporation) was dissolved in water (2258 g). Into the resulting solution, 35% by weight of an aqueous hydrogen peroxide solution (1309 g) (manufactured by Kishida Chemical Co., Ltd.) was added to prepare a mixed solution thereof. Into ion exchange water (4700 g) in a container, the mixed solution and 25% by weight of an aqueous ammonia solution (3746 g) (extra-pure reagent, manufactured by Wako Pure Chemical Industries) were added at a rate of 14.9 ml/min and at a rate of 17.9 ml/min., respectively, while stirring at 117 rpm, and were reacted with each other. The reaction was conducted at a temperature in the range of from 23° C. to 35° C. to obtain a slurry. The amount of the aqueous ammonia solution used here was twice as large as the amount required for converting the titanium oxysulfate into a titanium hydroxide. The slurry was filtrated to obtain a reaction product therein. The reaction product was washed with ion exchange water, and was dried to obtain a powder. The powder was calcined in air at a temperature of 370° C. for one (1) hour, and subsequently was cooled to a room temperature, to obtain a particle-shaped anatase-type titanium oxide having 15% by weight of moisture content.

Ammonium titanyl oxalate (3.68 g) [(NH$_4$)$_2$[TiO(C$_2$O$_4$)$_2$]] (manufactured by Sigma-Aldrich Co.) is dissolved in ion exchange water (86.32 g). Into the resulting solution, the above-described particle-shaped anatase type titanium oxide (10 g) is added and is mixed with each other to obtain a mixture. The amount of ammonium titanyl oxalate used here is 43 parts by weight based on 100 parts by weight of the titanium oxide. The obtained mixture is subjected to dispersing treatment in the same manner as in Example 1, to obtain a titanium oxide dispersion liquid. After preparing a dispersion liquid having 0.2% by weight of solid content, transmittance spectrum of the dispersion liquid is measured. Using the titanium oxide dispersion liquid, an applied film thereof is formed onto a slide glass in the same manner as in Example 1.

Example 5

Figure 13:
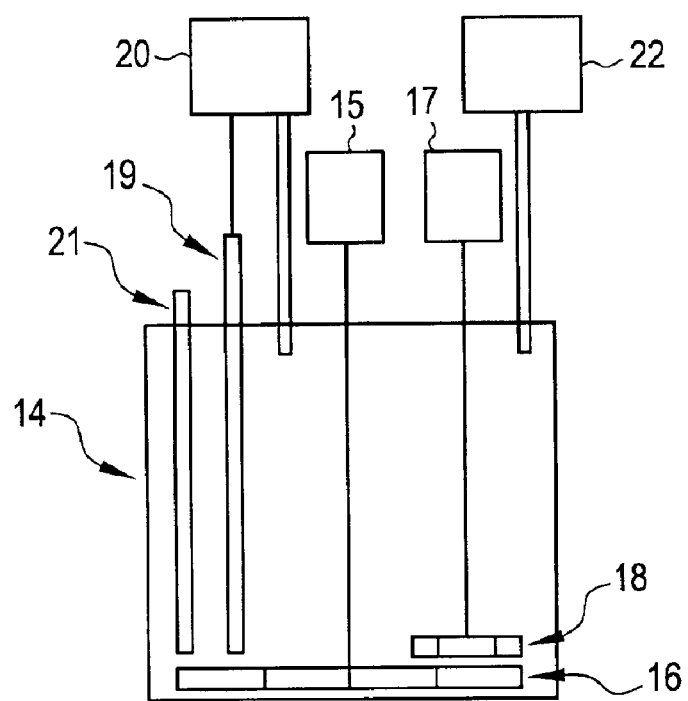
FIG. 13 show a reactor which may be utilized for preparing a titanium oxide that may be contained as a ceramics in a ceramics dispersion liquids of the present invention.

Titanium oxysulfate (3388 g) (manufactured by Tayca Corporation) was dissolved in water (2258 g). Into the resulting solution, 35% by weight of an aqueous hydrogen peroxide solution (1309 g) (manufactured by Kishida Chemical Co., Ltd.) was added to prepare a mixed solution. The resulting mixed solution was reacted with ammonia. The reaction was conducted using a reactor shown in FIG. 13.

The reactor comprises
cylindrical container 14 having an inside diameter of 33 cm and height of 33 cm;
agitating blade 16 (installed in inside of container 14) having six blades with three (3) cm of length, 15 cm of width and diameter of blade of 30 cm, agitating blade 16 being driven with motor 15;
agitating blade 18 (installed in inside of container 14) having six blades with one (1) cm of length, five (5) cm of width and diameter of blade of 10 cm, agitating blade 18 being driven with motor 17;
pH electrode 19 (installed in inside of container 14);
pH controller 20 (connected to pH electrode 19) that has a function of supplying 25% by weight of an aqueous ammonia solution (extra-pure reagent, manufactured by Wako Pure Chemical Industries) for uniformly adjusting pH of a solution in container 14;
thermometer 21 (installed in inside of container 14); and
feeder 22 that supplies the above-obtained mixed solution into container 14.

Into container 14, ion exchange water (4700 g) was supplied. A pH value of controller 20 was set to 4, and a pH value of the ion exchange water in container 14 was adjusted to the setting value 4 using a dilute sulfuric acid. The above-prepared mixed solution was supplied into container 14 using feeder 22 at 50 ml/min. under agitation with agitating blade 16 at 50 rpm and with agitating blade 18 at 500 rpm, while being reacted with the aqueous ammonia solution that was supplied from pH controller 20 into container 14, to obtain a reaction product in the mixture. The reaction temperature was in the range of from 23° C. to 58° C. It is noted that pH controller 20 works such that when a pH value of a liquid in the container becomes lower than a setting pH value, the aqueous ammonia solution is supplied continuously at a rate of 50 ml/min. until the pH value of the liquid reaches the setting value.

The mixture was maintained for one (1) hour, with stirring. Then, into the mixture, 25% by weight of an aqueous ammonia solution (extra-pure reagent, manufactured by Wako Pure Chemical Industries) was supplied to obtain a slurry. The total amount of the aqueous ammonia solution supplied to container 14 was 3746 g, that was twice as large as the amount required fro converting the titanium oxysulfate into a titanium hydroxide. The slurry was then filtrated to obtain the reaction product therein. The reaction product was washed with ion exchange water, and was dried to obtain a powder. The powder was calcined in air at a temperature of 370° C. for one (1) hour, and subsequently was cooled to a room temperature, to obtain a particle-shaped anatase-type titanium oxide having 15% by weight of moisture content.

Ammonium titanyl oxalate monohydrate (3.68 g) [(NH$_4$)$_2$[TiO(C$_2$O$_4$)$_2$]·H$_2$O] (manufactured by Sigma-Aldrich Co.) was dissolved in water (76.32 g). Into the resulting aqueous ammonium titanyl oxalate solution, the above-described particle-shaped anatase-type titanium oxides (20 g) was added and mixed with each other. The amount of the ammonium titanyl oxalate used here was 17 parts by weight based on 100 parts by weight of the titanium oxide. The resulting mixture was subjected to dispersing treatment at a temperature of 20° C. for 9 hours using a medium agitation-type grinder (trade name: 4TSG-1/8, manufactured by Igarashi Machine Co.,) containing beads made of zirconia having an outside diameter of 0.3 mm as medium, to obtain a titanium oxide dispersion liquid. The dispersion liquid contained a solid of which mean particle diameter was 75.3 nm, and had 10% by weight of a solid content. The solid was a titanium oxide of which crystal structure was anatase type.

Figure 14:
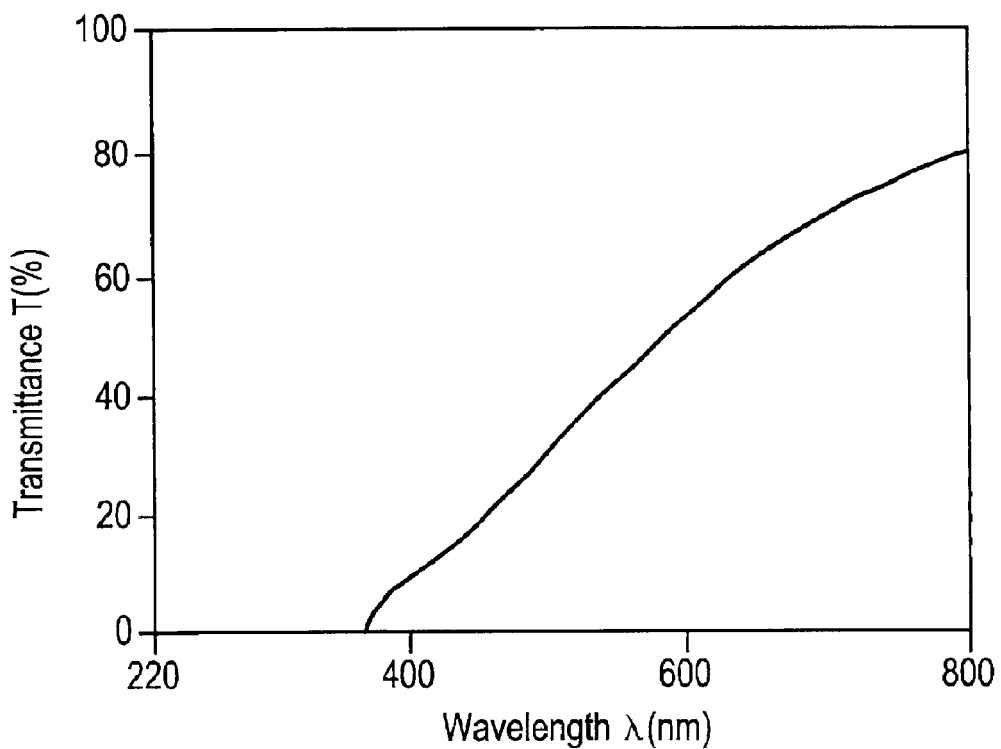
Figure 15:
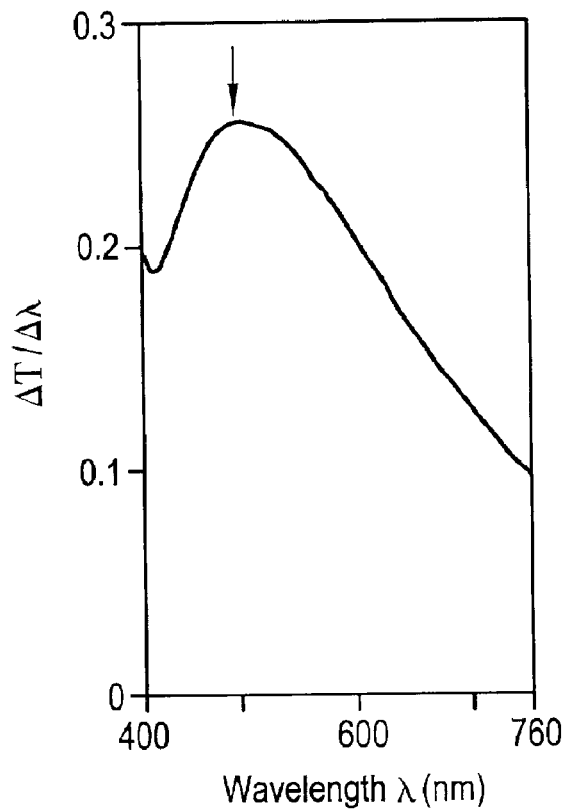

Into a part of the obtained titanium oxide dispersion liquid, water was added so as to prepare a dispersion liquid having a solid content of 0.2% by weight. Using the prepared dispersion liquid, a transmittance spectrum of the titanium oxide dispersion liquid was measured. The transmittance spectrum is shown in FIG. 14. Transmittances $T_1$ and $T_2$, integrated values A and B, index X and index Y of the transmittance spectrum are shown in Table 4. The transmittance spectrum was differentiated to obtain a primary differential transmittance spectrum of the titanium oxide dispersion liquid. The primary differential transmittance spectrum is shown in FIG. 15. The wavelength at which the primary differential transmittance spectrum has a maximal intensity is shown in Table 4.

Into a part of the obtained titanium oxide dispersion liquid, water was added to obtain a dispersion liquid having a solid content of 2% by weight. The dispersion liquid was applied onto a quartz glass having a length of 40 mm, a width of 40 mm and a thickness of one (1) mm. The quartz glass was rotated using a spin coater (trade name: 1H-D3, manufactured by MIKASA) at 300 rpm for 5 seconds and subsequently at 500 rpm for 30 seconds, to remove an excessive dispersion liquid therefrom. Then, the quartz glass was dried at 110° C. The above-described applying and drying operation of the dispersion liquid on the quartz glass was repeated three (3) times, to form an applied film of the titanium oxide dispersion liquid on whole one side of the quartz glass.

Figure 16:
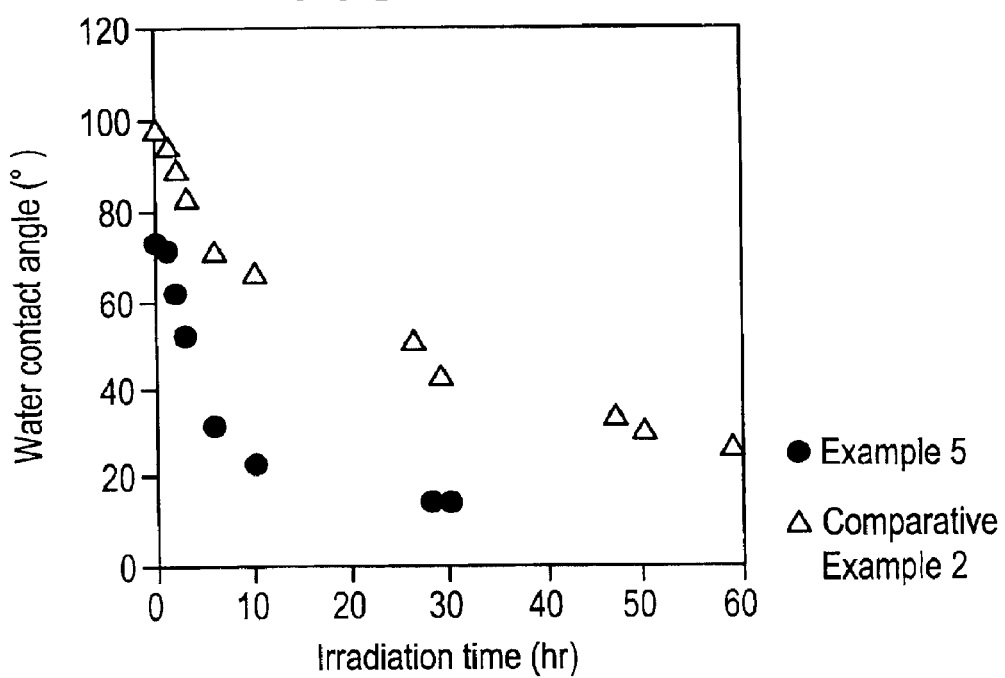

Hydrophilic properties of the applied film were evaluated. The results are shown in FIG. 16.

Comparative Example 2

Figure 17:
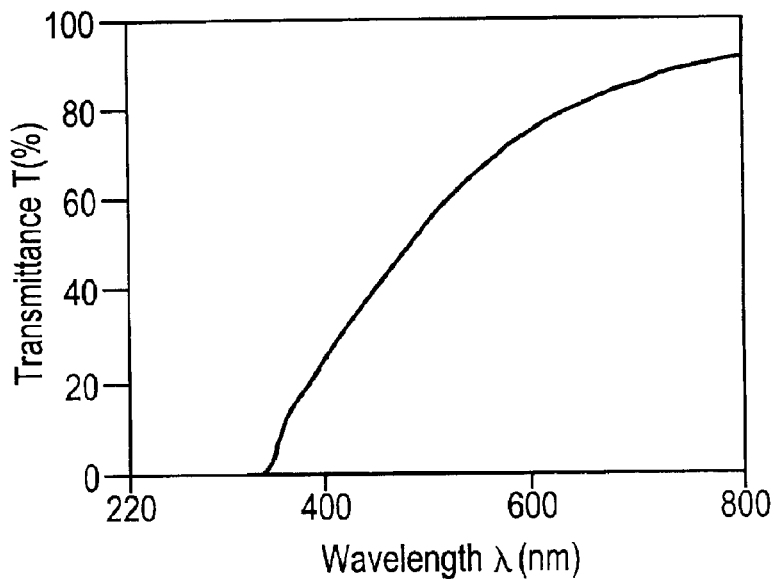
Figure 18:
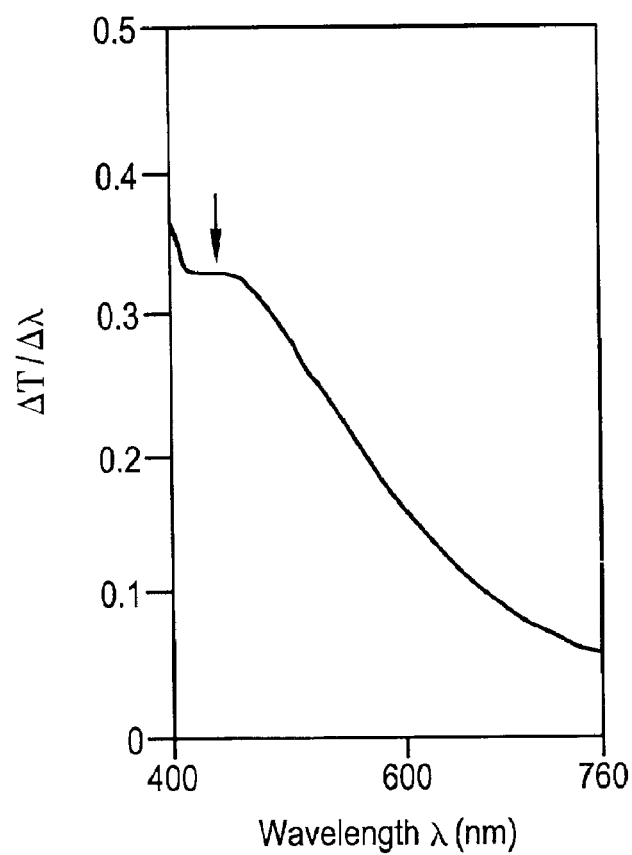

Into a commercially available titanium oxide photocatalyst coating agent consisting of titanium oxide, $HNO_3$ and water (trade name: STS-01, solid content: 30% by weight, mean particle diameter of the titanium oxide in the coating agent: 50 nm, manufactured by ISHIHARA SANGYO KAISHA LTD.), water was added so as to prepare a dispersion liquid having a solid content of 0.2% by weight. Using the prepared dispersion liquid, a transmittance spectrum of the coating agent was measured. The transmittance spectrum is shown in FIG. 17. Transmittances $T_1$ and $T_2$, integrated values A and B, index X and index Y of the transmittance spectrum are shown in Table 4. The transmittance spectrum was differentiated to obtain a primary differential transmittance spectrum of the coating agent. The primary differential transmittance spectrum is shown in FIG. 18. The wavelength at which the primary differential transmittance spectrum has a maximal intensity is shown in Table 4.

An applied film was formed on whole one side of a slide glass in the same manner as in Example 5 except that the above-described commercially available titanium oxide photocatalyst coating agent (trade name: STS-01) was used, instead of using the dispersion liquid obtained in Example 5.

Hydrophilic properties of the applied film were evaluated. The results are shown in FIG. 16.

TABLE 4

|  | Example 5 | Comparative Example 2 |
|---|---|---|
| Transmittance $T_1$ (%) | 82.57 | 91.08 |
| Transmittance $T_2$ (%) | 10.09 | 19.12 |
| Index X (= $T_2/T_1$) | 0.122 | 0.210 |
| Integrated value A | 234.4 | 444.5 |
| Integrated value B | 1637 | 1818 |
| Index Y (= A/B) | 0.143 | 0.244 |
| Wavelength (nm) at which a primary differential transmittance spectrum has a maximum intensity | 498 | 441 |

What is claimed is:

1. A ceramics dispersion liquid comprising
   (i) a ceramics,
   (ii) a dispersion medium, and
   (iii) at least one compound selected from a carboxylic acid; an ammonium carboxylate; a salt of carboxylic acid with metal selected from Ia group, IIa group, IIIa group, Va group, VIa group, VIIa group, VIII group, Ib group, IIb group, IIIb group, IVb group and lanthanoid group; and a salt of oxalic acid with metal selected from IVa group.

2. The ceramics dispersion liquid according to claim 1, wherein the compound (iii) is at least one compound selected from a carboxylic acid; an ammonium carboxylate; a salt of carboxylic acid with metal selected from Ia group, IIa group, IIIa group, Va group, VIa group, VIIa group, VIII group, Ib group, IIb group, IIIb group, IVb group and lanthanoid group.

3. The ceramics dispersion liquid according to claim 1, wherein the compound (iii) is at least one compound selected from oxalic acid, ammonium oxalate, ammonium hydrogen oxalate, lithium oxalate, lithium hydrogen oxalate, sodium xalate, sodium hydrogen oxalate, potassium oxalate, potassium hydrogen oxalate, magnesium oxalate, calcium oxalate, strontium oxalate and barium oxalate.

4. The ceramics dispersion liquid according to claim 1, wherein the compound (iii) is at least one compound selected from salts of oxalic acid with metal selected from IVa group.

5. The ceramics dispersion liquid according to claim 4, wherein the ceramics dispersion liquid contains the at least one compound selected from salts of oxalic acid with metal selected from IVa group in an amount of from about one parts by weight to 50 parts by weight based on 100 parts by weight of the ceramics.

6. The ceramics dispersion liquid according to any of claims 1, 4 and 5, wherein the salt of oxalic acid is a compound selected from titanium oxalate, titanium oxyoxalate, ammonium titanium oxalate and ammonium titanyl oxalate.

7. The ceramics dispersion liquid according to any of claims 1, 2 and 4, wherein the ceramics dispersion liquid has index X of about 0.175 or less, index X being calculated by equation (I):

$$X = T_2/T_1 \qquad (I)$$

wherein $T_1$ represents an transmittance at a wavelength of 800 nm in a transmittance spectrum of the ceramics dispersion liquid and $T_2$ represents an transmittance at a wavelength of 400 nm in the transmittance spectrum, the transmittance spectrum being measured using a solution of the ceramics dispersion liquid which is prepared so that the solid content thereof is in the range of from 0.1% by weight to 10% by weight.

8. The ceramics dispersion liquid according to claim 7, wherein the transmittance spectrum is measured using a solution of the ceramics dispersion liquid which is prepared so that the solid content thereof is about 0.2% by weight.

9. The ceramics dispersion liquid according to any of claims 1, 2 and 4, wherein the ceramics dispersion liquid has index Y of about 0.4 or less, index Y being calculated by equation (II):

$$Y=A/B \qquad (II)$$

wherein A represents an integrated value of transmittance within a wavelength range of from 400 nm to 420 nm along a transmittance spectrum of the titanium oxide and B represents an integrated value of transmittance within a wavelength range of from 780 nm to 800 nm along the transmittance spectrum, the transmittance spectrum being measured using a solution of the ceramics dispersion liquid which is prepared so that the solid content thereof is in the range of from 0.1% by weight to 10% by weight.

10. The ceramics dispersion liquid according to claim 9, wherein the transmittance spectrum is measured using a solution of the ceramics dispersion liquid which is prepared so that the solid content thereof is about 0.2% by weight.

11. The ceramics dispersion liquid according to claim 1, wherein the ceramics has a shape of particle having a mean particle diameter of about 500 nm or smaller.

12. The ceramics dispersion liquid according to claim 1, wherein the ceramics is a titanium oxide.

13. The ceramics dispersion liquid according to claim 1, wherein the ceramics is a titanium oxide which has an anatase-type crystal structure.

14. The ceramics dispersion liquid according to claim 1, wherein the ceramics is a titanium oxide which has index Z of about 0.97 or less, index Z being calculated by equation (III):

$$Z=D/C \qquad (III)$$

wherein, among the four-time measurements of X-ray photoelectron spectrum of the titanium oxide, C represents an average value of the half-widths of peaks within the range of binding energy of from 458 eV to 460 eV in the first and second X-ray photoelectron spectra and D represents an average value of the half-widths of peaks within the range of binding energy of from 458 eV to 460 eV in the third and fourth X-ray photoelectron spectra.

15. The ceramics dispersion liquid according to claim 1, wherein the ceramics is a titanium oxide which has index W of about 0.075 or more, index W being calculated by equation (IV):

$$W=F/E \qquad (IV)$$

wherein E represents an integrated value of absorbance within a wavelength range of from 250 nm to 550 nm along an ultraviolet-visible diffuse reflection spectrum of the titanium oxide, and F represents an integrated value of absorbance within a wavelength range of from 400 nm to 550 nm along the ultraviolet-visible diffuse reflection spectrum.

16. The ceramics dispersion liquid according to claim 1, wherein dispersion medium (ii) dissolves compound (iii).

17. The ceramics dispersion liquid according to claim 1, wherein the ceramics dispersion liquid has a maximal intensity at a wavelength in the range of from 400 nm to 760 nm in a primary differential spectrum of a transmittance spectrum of the ceramics dispersion liquid, the transmittance spectrum being measured using a solution of the ceramics dispersion liquid which is prepared so that the solid content thereof is in the range of from 0.1% by weight to 10% by weight.

18. The ceramics dispersion liquid according to claim 17, wherein the transmittance spectrum is measured using a solution of the ceramics dispersion liquid which is prepared so that the solid content thereof is about 0.2% by weight.

19. A hydrophilic coating agent comprising the ceramics dispersion liquid according to claim 1.

20. An applied film which contains the hydrophilic coating agent comprising the ceramics dispersion liquid according to claim 1.

21. The applied film according to claim 20, wherein the applied film has a water contact angle of no more than 45°, the water contact angle being measured after an acetone solution containing oleic acid is applied and dried on a surface of the applied film and then the film is irradiated with irradiation of visible light in air at a temperature of about 25° C. for 24 hours using a 500 W xenon lamp in which light with a wavelength of no more than 430 nm is cut.

22. The applied film according to claim 21, wherein the applied film has a water contact angle of no more than 35°.

23. The photocatalytic functional product comprising the applied film according to claim 21 or 22.

24. A photocatalytic functional product comprising the applied film which contains the hydrophilic coating agent comprising the ceramics dispersion liquid according to claim 1.

25. A method for producing a ceramics dispersion liquid, the method comprising the steps of:

mixing a ceramics, a dispersion medium and at least one compound selected from a carboxylic acid; an ammonium carboxylate; a salt of carboxylic acid with metal selected from Ia group, IIa group, IIIa group, Va group, VIa group, VIIa group, VIII group, Ib group, IIb group, IIIb group, IVb group and lanthanoid group; and a salt of oxalic acid with metal selected from IVa group to obtain a mixture thereof; and subjecting the mixture to dispersing treatment.

26. A method for producing a ceramics dispersion liquid, the method comprising the steps of:

mixing a ceramics, a dispersion medium and a hydrate or acid anhydride of a carboxylic acid; an ammonium carboxylate; a salt of carboxylic acid with metal selected from Ia group, IIa group, IIIa group, Va group, VIa group, VIIa group, VIII group, Ib group, IIb group, IIIb group, IVb group and lanthanoid group; and a salt of oxalic acid with metal selected from IVa group to obtain a mixture thereof; and subjecting the mixture to dispersing treatment.

27. The method for producing a ceramics dispersion liquid according to claim 25 or 26, wherein the ceramics are a titanium oxide.

28. The method for producing a ceramics dispersion liquid according to claim 25 or 26, wherein the dispersing treatment is conducted substantially under the conditions in which a crystal structure of the main component of the ceramics is not substantially changed.

* * * * *